United States Patent
Danilov et al.

(10) Patent No.: US 10,846,003 B2
(45) Date of Patent: Nov. 24, 2020

(54) DOUBLY MAPPED REDUNDANT ARRAY OF INDEPENDENT NODES FOR DATA STORAGE

(71) Applicant: EMC IP Holding Company LLC, Hopkinton, MA (US)

(72) Inventors: Mikhail Danilov, Saint Petersburg (RU); Pavel Egorov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/261,549

(22) Filed: Jan. 29, 2019

(65) Prior Publication Data

US 2020/0241772 A1    Jul. 30, 2020

(51) Int. Cl.
*G06F 3/06*    (2006.01)

(52) U.S. Cl.
CPC .......... *G06F 3/0631* (2013.01); *G06F 3/0619* (2013.01); *G06F 3/0689* (2013.01)

(58) Field of Classification Search
CPC ...... G06F 3/067; G06F 3/0631; G06F 3/0619; G06F 3/0689; G06F 3/0687
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 7,389,393 B1 | 6/2008 | Karr et al. | |
| 7,680,875 B1 | 3/2010 | Shopiro et al. | |
| 7,721,044 B1 | 5/2010 | Chatterjee et al. | |
| 8,370,542 B2 | 2/2013 | Lu et al. | |
| 8,479,037 B1 | 7/2013 | Chatterjee et al. | |
| 8,495,465 B1 | 7/2013 | Anholt et al. | |
| 8,751,740 B1 * | 6/2014 | de Forest | G06F 3/061 711/114 |

(Continued)

OTHER PUBLICATIONS

C. Qiang, G. Tian-jie and X. Chang-sheng, "Dynamics Process of Long-running Allocation/Collection in Linear Storage Space," 2007 International Conference on Networking, Architecture, and Storage (NAS 2007), Guilin, 2007, pp. 209-216, doi: 10.1109/NAS.2007.24. (Year: 2007).*

(Continued)

*Primary Examiner* — Khoa D Doan
(74) *Attorney, Agent, or Firm* — Amin, Turocy & Watson, LLP

(57) ABSTRACT

A doubly mapped redundant array of independent nodes (doubly mapped RAIN) for data storage is disclosed. A doubly mapped RAIN cluster can be allocated on top of one or more real data clusters. The real data cluster can be N nodes by M disks by L extents. A doubly mapped RAIN cluster can be N' nodes by M' disks by L' extents, where N' is less than, or equal to N. Mapping of data storage locations in a doubly mapped RAIN cluster can facilitate use of a real cluster at a different granularity than in either a conventionally administered real cluster or in a singly mapped RAIN. The topology of a doubly mapped RAIN can be constrained via rules related to correlation of real disks to mapped nodes, correlation of real extents to mapped nodes, correlation or real extents to mapped disks, etc.

20 Claims, 10 Drawing Sheets

(56) References Cited

U.S. PATENT DOCUMENTS

| | | | |
|---|---|---|---|
| 8,799,746 B2 | 8/2014 | Baker et al. | |
| 8,832,234 B1 | 9/2014 | Brooker et al. | |
| 8,856,619 B1 | 10/2014 | Cypher | |
| 8,972,478 B1 | 3/2015 | Storer et al. | |
| 9,003,086 B1 | 4/2015 | Schuller et al. | |
| 9,063,838 B1 | 6/2015 | Boyle et al. | |
| 9,208,009 B2 | 12/2015 | Resch et al. | |
| 9,244,761 B2 | 1/2016 | Yekhanin et al. | |
| 9,274,903 B1 | 3/2016 | Garlapati et al. | |
| 9,280,430 B2 | 3/2016 | Sarfare et al. | |
| 9,405,483 B1 | 8/2016 | Wei et al. | |
| 9,477,682 B1 | 10/2016 | Bent et al. | |
| 9,641,615 B1 | 5/2017 | Robins et al. | |
| 9,747,057 B1* | 8/2017 | Ramani | G06F 3/067 |
| 9,864,527 B1* | 1/2018 | Srivastav | H04L 67/1095 |
| 10,055,145 B1 | 8/2018 | Danilov et al. | |
| 10,127,234 B1* | 11/2018 | Krishnan | G06F 16/119 |
| 10,216,770 B1* | 2/2019 | Kulesza | G06F 9/50 |
| 10,242,022 B1* | 3/2019 | Jain | G06F 16/11 |
| 10,282,262 B2 | 5/2019 | Panara et al. | |
| 10,361,810 B2 | 7/2019 | Myung et al. | |
| 10,496,330 B1* | 12/2019 | Bernat | G06F 3/0659 |
| 10,503,611 B1 | 12/2019 | Srivastav et al. | |
| 10,613,780 B1 | 4/2020 | Naeni et al. | |
| 10,733,053 B1 | 8/2020 | Miller et al. | |
| 2002/0166026 A1 | 11/2002 | Ulrich et al. | |
| 2005/0080982 A1 | 4/2005 | Vasilevsky et al. | |
| 2005/0088318 A1 | 4/2005 | Liu et al. | |
| 2005/0140529 A1 | 6/2005 | Choi et al. | |
| 2005/0234941 A1* | 10/2005 | Watanabe | G06F 3/0614 |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2007/0076321 A1 | 4/2007 | Takahashi et al. | |
| 2007/0239759 A1 | 10/2007 | Shen et al. | |
| 2007/0250674 A1 | 10/2007 | Findberg et al. | |
| 2008/0222480 A1 | 9/2008 | Huang | |
| 2008/0222481 A1 | 9/2008 | Huang | |
| 2008/0244353 A1 | 10/2008 | Dholakia et al. | |
| 2008/0320061 A1 | 12/2008 | Aszmann et al. | |
| 2009/0070771 A1 | 3/2009 | Yuyitung et al. | |
| 2009/0113034 A1 | 4/2009 | Krishnappa et al. | |
| 2009/0172464 A1 | 7/2009 | Byrne et al. | |
| 2009/0183056 A1 | 7/2009 | Aston | |
| 2009/0204959 A1 | 8/2009 | Anand et al. | |
| 2009/0240880 A1 | 9/2009 | Kawaguchi | |
| 2009/0259882 A1 | 10/2009 | Shellhamer | |
| 2010/0031060 A1 | 2/2010 | Chew et al. | |
| 2010/0218037 A1 | 8/2010 | Swartz et al. | |
| 2010/0293348 A1 | 11/2010 | Ye et al. | |
| 2010/0332748 A1 | 12/2010 | Van Der Goot et al. | |
| 2011/0029836 A1 | 2/2011 | Dhuse et al. | |
| 2011/0106972 A1 | 5/2011 | Grube et al. | |
| 2011/0107165 A1 | 5/2011 | Resch et al. | |
| 2011/0138148 A1 | 6/2011 | Friedman et al. | |
| 2011/0196833 A1 | 8/2011 | Drobychev et al. | |
| 2011/0246503 A1 | 10/2011 | Bender et al. | |
| 2012/0023291 A1 | 1/2012 | Zeng et al. | |
| 2012/0096214 A1 | 4/2012 | Lu et al. | |
| 2012/0191675 A1 | 7/2012 | Kim et al. | |
| 2012/0191901 A1 | 7/2012 | Norair | |
| 2012/0204077 A1 | 8/2012 | D'Abreu et al. | |
| 2012/0233117 A1 | 9/2012 | Holt et al. | |
| 2012/0311395 A1 | 12/2012 | Leggette et al. | |
| 2012/0317234 A1 | 12/2012 | Bohrer et al. | |
| 2012/0321052 A1 | 12/2012 | Morrill et al. | |
| 2013/0047187 A1 | 2/2013 | Frazier et al. | |
| 2013/0054822 A1 | 2/2013 | Mordani et al. | |
| 2013/0067159 A1 | 3/2013 | Mehra | |
| 2013/0067187 A1 | 3/2013 | Moss et al. | |
| 2013/0088501 A1 | 4/2013 | Fell | |
| 2013/0097470 A1 | 4/2013 | Hwang et al. | |
| 2013/0238932 A1 | 9/2013 | Resch | |
| 2013/0246876 A1 | 9/2013 | Manssour et al. | |
| 2013/0290482 A1 | 10/2013 | Leggette | |
| 2014/0040417 A1 | 2/2014 | Galdwin et al. | |
| 2014/0064048 A1 | 3/2014 | Cohen et al. | |
| 2014/0115182 A1 | 4/2014 | Sabaa et al. | |
| 2014/0164430 A1* | 6/2014 | Hadjieleftheriou | G06F 16/2379 707/770 |
| 2014/0164694 A1 | 6/2014 | Storer | |
| 2014/0280375 A1 | 9/2014 | Rawson | |
| 2014/0281804 A1 | 9/2014 | Resch | |
| 2014/0297955 A1 | 10/2014 | Yamazaki et al. | |
| 2014/0331100 A1 | 11/2014 | Dhuse et al. | |
| 2014/0358972 A1 | 12/2014 | Guarrieri et al. | |
| 2014/0359244 A1 | 12/2014 | Chambliss et al. | |
| 2014/0380088 A1 | 12/2014 | Bennett et al. | |
| 2014/0380125 A1 | 12/2014 | Calder et al. | |
| 2015/0006846 A1 | 1/2015 | Youngworth | |
| 2015/0074065 A1 | 3/2015 | Christ et al. | |
| 2015/0112951 A1 | 4/2015 | Narayanamurthy et al. | |
| 2015/0134626 A1 | 5/2015 | Theimer et al. | |
| 2015/0142863 A1 | 5/2015 | Yuen et al. | |
| 2015/0178007 A1 | 6/2015 | Moisa et al. | |
| 2015/0186043 A1 | 7/2015 | Kesselman et al. | |
| 2015/0303949 A1 | 10/2015 | Jafarkhani et al. | |
| 2015/0331766 A1* | 11/2015 | Sarfare | G06F 11/1662 714/4.11 |
| 2015/0370656 A1 | 12/2015 | Tsafrir et al. | |
| 2016/0011935 A1 | 1/2016 | Luby | |
| 2016/0011936 A1 | 1/2016 | Luby | |
| 2016/0055054 A1 | 2/2016 | Patterson, III et al. | |
| 2016/0162378 A1 | 6/2016 | Garlapati et al. | |
| 2016/0170668 A1 | 6/2016 | Mehra | |
| 2016/0217104 A1 | 7/2016 | Kamble et al. | |
| 2016/0232055 A1 | 8/2016 | Vairavanathan et al. | |
| 2016/0328295 A1 | 11/2016 | Baptist et al. | |
| 2016/0357649 A1 | 12/2016 | Karrotu et al. | |
| 2016/0371145 A1 | 12/2016 | Akutsu et al. | |
| 2016/0378624 A1 | 12/2016 | Jenkins, Jr. et al. | |
| 2016/0380650 A1 | 12/2016 | Calder et al. | |
| 2017/0003880 A1 | 1/2017 | Fisher et al. | |
| 2017/0004044 A1 | 1/2017 | Tormasov et al. | |
| 2017/0017671 A1 | 1/2017 | Baptist et al. | |
| 2017/0031945 A1 | 2/2017 | Sarab et al. | |
| 2017/0097875 A1 | 4/2017 | Jess et al. | |
| 2017/0102993 A1 | 4/2017 | Hu et al. | |
| 2017/0187398 A1 | 6/2017 | Trusov | |
| 2017/0187766 A1 | 6/2017 | Zheng et al. | |
| 2017/0206025 A1 | 7/2017 | Viswanathan | |
| 2017/0206135 A1 | 7/2017 | Zeng | |
| 2017/0212680 A1 | 7/2017 | Waghulde | |
| 2017/0212845 A1 | 7/2017 | Conway | |
| 2017/0235507 A1* | 8/2017 | Sinha | G06F 16/2365 711/114 |
| 2017/0262187 A1 | 9/2017 | Manzanares et al. | |
| 2017/0286516 A1 | 10/2017 | Horowitz et al. | |
| 2017/0344285 A1 | 11/2017 | Choi et al. | |
| 2018/0052744 A1 | 2/2018 | Chen et al. | |
| 2018/0063213 A1 | 3/2018 | Bevilacqua-Linn et al. | |
| 2018/0074881 A1 | 3/2018 | Burden | |
| 2018/0121286 A1 | 5/2018 | Sipos | |
| 2018/0129417 A1 | 5/2018 | Sivasubramanian et al. | |
| 2018/0181324 A1 | 6/2018 | Danilov et al. | |
| 2018/0181612 A1 | 6/2018 | Danilov et al. | |
| 2018/0246668 A1 | 8/2018 | Sakashita et al. | |
| 2018/0267856 A1 | 9/2018 | Hayasaka et al. | |
| 2018/0267985 A1 | 9/2018 | Badey | |
| 2018/0306600 A1 | 10/2018 | Nicolaas et al. | |
| 2018/0307560 A1 | 10/2018 | Vishnumolakala et al. | |
| 2018/0341662 A1 | 11/2018 | He | |
| 2019/0028179 A1 | 1/2019 | Kalhan | |
| 2019/0034084 A1 | 1/2019 | Nagarajan et al. | |
| 2019/0043201 A1 | 2/2019 | Strong et al. | |
| 2019/0043351 A1 | 2/2019 | Yang et al. | |
| 2019/0050301 A1 | 2/2019 | Juniwal et al. | |
| 2019/0065092 A1 | 2/2019 | Shah et al. | |
| 2019/0065310 A1 | 2/2019 | Rozas | |
| 2019/0114223 A1 | 4/2019 | Pydipaty et al. | |
| 2019/0205437 A1 | 7/2019 | Larson et al. | |
| 2019/0215017 A1 | 7/2019 | Danilov et al. | |
| 2019/0220207 A1 | 7/2019 | Lingarajappa | |

(56) References Cited

U.S. PATENT DOCUMENTS

| | | |
|---|---|---|
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1 | 2/2020 | Chien et al. |
| 2020/0104377 A1 | 4/2020 | Eamesty, Jr. et al. |
| 2020/0117556 A1 | 4/2020 | Zou et al. |

OTHER PUBLICATIONS

Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Office Action dated Oct. 15, 2020 for U.S. Appl. No. 16/526,142, 21 pages.
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Nikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6,2020, 29 pages.
Non-Final Office Action received for U.S. Appl. No. 15/791,390 dated Apr. 30, 2020, 48 pages.
Huang et al., "Scale-RS: An Efficient Scaling Scheme for Rs-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21,2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 151651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—Raid 6", URL: https://en.wikipedia.org/wiki/Standard_RAID_Ievels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177, 278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed Raid—A New Multiple Copy Algorithm.", IEEE ICDE, 1990, pp. 430-437.
Muralidhar et al. "f4: Facebook's Warm BLOB Storage System", USENIX, OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 05, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 06, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Silo et al., "GeoScale: Providing Geo-Elasticity in Distributed Clouds" 2016 IEEE International Conference on Cloud Engineering, 4 pages.

* cited by examiner

DOUBLY MAPPED REDUNDANT ARRAY OF INDEPENDENT NODES FOR DATA STORAGE

TECHNICAL FIELD

The disclosed subject matter relates to data storage, more particularly, to mapping storage pools comprising storage devices of at least one array of storage devices.

BACKGROUND

Conventional data storage techniques can store data in one or more arrays of data storage devices. As an example, data can be stored in an ECS (formerly known as ELASTIC CLOUD STORAGE) system, hereinafter an ECS system, such as is provided by DELL EMC. The example ECS system can comprise data storage devices, e.g., disks, etc., arranged in nodes, wherein hardware nodes, e.g., real nodes, etc., can be comprised in an ECS cluster, e.g., an N×M ECS cluster comprising N hardware nodes each having M real disks. One use of data storage is in bulk data storage. Data can conventionally be stored in a 'group of nodes' format for a given cluster, for example, in a conventional ECS system, all disks of nodes comprising the group of nodes, e.g., ECS cluster, etc., are considered part of the group. As such, a group with nodes having many disks can, in some conventional embodiments, comprise a large amount of storage, much of which can go underutilized. As an example, a storage group of five nodes, with ten disks per node, at 8 terabytes (TBs) per disk is roughly 400 TB in size, which can be excessively large for some types of data storage. Additionally, apportioning smaller real groups, e.g., groups having fewer real nodes, groups having real nodes with fewer real disks, groups having real nodes with smaller real disks, etc., can be inefficient in regards to processor, network, storage resources, etc., e.g., computer resource usage, to support these smaller groups. As such, it can be desirable to provide logical storage groups, and corresponding hardware, software, firmware, etc., at a more granular level to employ portions of larger real groups, thereby promoting more efficient computer resource usage, e.g., retaining a large real group(s) but providing a smaller logical group(s) that can be more suitable for storing some types of data, e.g., smaller amounts of data, slower access to data, etc., that otherwise can be inefficient to store in the example large real group(s).

DETAILED DESCRIPTION

Figure 1:
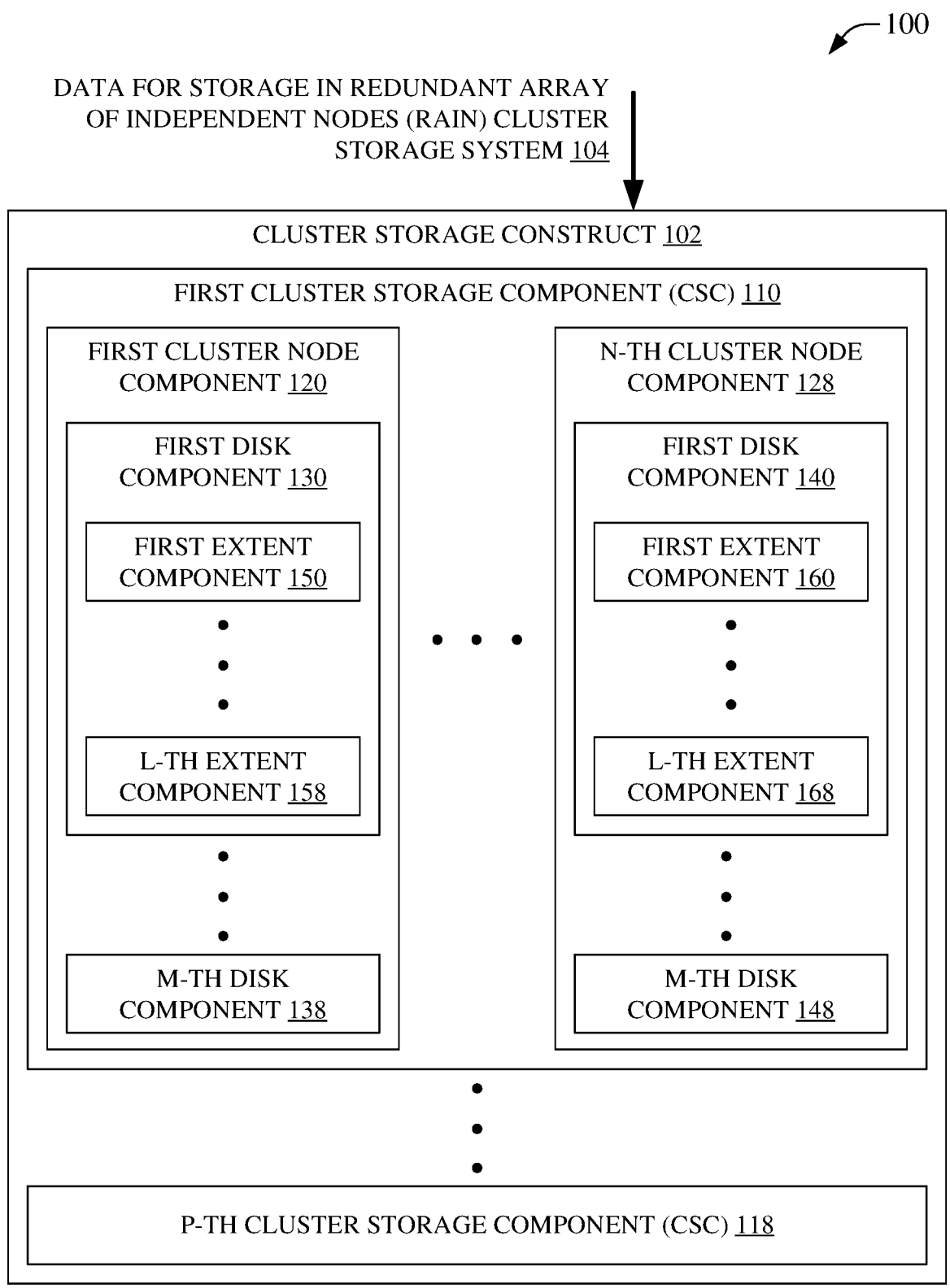
FIG. 1 is an illustration of an example system that can facilitate storage of data in a doubly mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise real data storage devices, e.g., physical disks, etc., arranged in real nodes, wherein real nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a real node with real disks can, in some conventional embodiments, comprise a large amount of real data storage that can be underutilized. As such, it can be desirable to have more granular logical storage groups that can employ portions of the real groups, thereby facilitating efficient computer resource usage, e.g., via portions of real groups provided via logical groups, wherein the logical groups can be used for storing data in a manner that can be more efficient than storing the same data directly in the real groups of real nodes.

In an embodiment of the presently disclosed subject matter, a doubly mapped redundant array of independent nodes, hereinafter a doubly mapped RAIN, doubly mapped cluster, etc., can comprise a logical data storage arrangement corresponding to data stored on real storage devices. In a doubly mapped cluster, a real cluster(s), e.g., a group of real storage devices comprised in one or more hardware nodes, comprised in one or more real clusters, can be defined to allow more granular use of the real cluster in contrast to conventional storage techniques. In an aspect, a doubly mapped cluster can comprise doubly mapped nodes that can provide data redundancy, which, in an aspect, can allow for failure of a portion of one or more doubly mapped nodes of the doubly mapped cluster without loss of access to stored data, can allow for removal/addition of one or more doubly mapped nodes from/to the doubly mapped cluster without loss of access to stored data, etc. As an example, a doubly mapped cluster can comprise doubly mapped nodes having a data redundancy scheme analogous to a redundant array of independent disks (RAID) type-6, e.g., RAID6, also known as double-parity RAID, etc., wherein employing a node topology and two parity stripes on each node can allow for two node failures before any data of the doubly mapped cluster becomes inaccessible, etc. In other example embodiments, a doubly mapped cluster can employ other node topologies and parity techniques to provide data redundancy, e.g., analogous to RAID0, RAID1, RAID2, RAID3, RAID4, RAID5, RAID6, RAID0+1, RAID1+0, etc., wherein a doubly mapped node of a doubly mapped cluster can comprise one or more disks, and the doubly mapped node can be loosely similar to one or more extents of a real disk in a real RAID system. Unlike RAID technology, an example doubly mapped RAIN system can provide access to more granular storage in generally very large data storage systems, often on the order of terabytes, petabytes, exabytes, zettabytes, etc., or even larger, because each doubly mapped node can generally comprise a plurality of extents of real disks, unlike conventional RAID technologies.

In an embodiment, software, firmware, etc., can hide the abstraction of doubly mapped nodes in a doubly mapped RAIN system, e.g., the group of doubly mapped nodes can appear to a client device to be a contiguous block of data storage even where, for example, it can be spread across multiple extents of one or more real disks, multiple real groups of hardware nodes (a real RAIN), multiple real clusters of hardware nodes (multiple real RAINs), multiple geographic locations, etc. For a given real cluster, e.g., real RAIN, that is N nodes wide by M disks deep by L extents per real disk, a doubly mapped RAIN can consist of up to N' mapped nodes of M' mapped disks having L' mapped extents. Accordingly, in an embodiment, one doubly mapped node is expected to manage extents of disks of different real nodes. Similarly, in an embodiment, extents of disks of one real node can be understood to be managed by doubly mapped nodes of different doubly mapped RAIN clusters. In some embodiments, the use of disks from one real node by two doubly mapped nodes of one doubly mapped cluster can be prohibited to harden doubly mapped RAIN clusters against a failure of one real node compromising two or more doubly mapped nodes of the doubly mapped RAIN cluster, e.g., a data loss event, etc. In some embodiments, the use of extents from one real disk by two doubly mapped disks of one doubly mapped cluster can be prohibited, similarly, to harden doubly mapped RAIN clusters against a failure of one real disk compromising two or more doubly mapped disks of the doubly mapped RAIN cluster. Hereinafter, an extent of a real disk can be comprised in a real node that can be comprised in a real cluster and, furthermore, the extent of the real disk can correspond to a portion of a doubly mapped disk, a doubly mapped disk can correspond to one or more extents of one or more real disks, a doubly mapped node can correspond to one or more portions of one or more real nodes, a doubly mapped cluster can correspond to one or more portions of one or more real clusters, etc., and, for convenience, the term RAIN can be omitted for brevity, e.g., a doubly mapped RAIN cluster can be referred to simply as a doubly mapped cluster, etc., Moreover, a doubly mapped RAIN node can simply be referred to as a doubly mapped node, etc., wherein 'mapped' is intended to convey a distinction between a logical representation of data from corresponding real data stored on a physical hardware component, wherein the real data and the doubly mapped data are related and have a defined relationship, e.g., the logical representation of data, e.g., a data representation, 'DR,' etc., can be stored in a non-volatile manner and can be related to real data stored on physical storage devices, wherein the relationship can allow a client device to operate on the DR to cause corresponding operation on the real data. As an example, a DR can comprise a logical storage address for a datum and a mapping to a real storage address of the datum such that an operation directed to the logical address is performed on the datum at the real storage address, etc.

In an embodiment, a doubly mapped cluster can correspond to a real cluster, e.g., the doubly mapped cluster can be N' by M' by L' in size and the real cluster can be N by M by L in size. It is noted that N' generally should not exceed N because where N'>N the prohibition against using disks of one real node in more than one doubly mapped node of a doubly mapped cluster must be violated. However, it is further noted that M' can be any number of logical disks, even exceeding M, for example, a 4×4×4 real cluster can be mapped to a 2×8×4 doubly mapped cluster, etc. Similarly, it is noted that L' can be any number of extents, for example, a 4×4×4 real cluster can be mapped by a 2×4×8 doubly mapped cluster, etc. In other embodiments, N' can be less than, or equal to, N, M' can be less than, or equal to, M, L' can be less than or equal to L, etc. In some embodiments, a doubly mapped cluster can be the same size as a real cluster, smaller than a real cluster, etc. Additionally, in some embodiments, a real cluster can comprise more than one doubly mapped cluster, e.g., where a doubly mapped cluster is sufficiently small in comparison to a real cluster, the real cluster can accommodate one or more additional doubly mapped clusters. In an aspect, where doubly mapped cluster(s) are smaller than a real cluster, the doubly mapped cluster can provide finer granularity of the data storage system. As an example, where a real cluster is 8×8×8, e.g., 8 nodes by 8 disks by 8 extents per disk, then, for example, four mapped 4×4×8 clusters can be provided, wherein each of the four doubly mapped 4×4×8 clusters is approximately ¼th the size of the real cluster. Additionally, the example 8×8×8 real cluster can provide a mix of different sized mapped clusters, for example one 8×4×8 doubly mapped cluster, one 4×4×8 doubly mapped cluster, and four 2×4×4 doubly mapped clusters. In some embodiments, not all of the real cluster must correspond to a sum of doubly mapped clusters, e.g., an example 8×8×8 real cluster, e.g., 512 real extents, can comprise only one 2×4×16 doubly mapped cluster, e.g., 128 doubly mapped extents, with the rest of the real cluster, e.g., 384 extents, not (yet) being allocated to correspond to other doubly mapped storage space.

A doubly mapped RAIN can, in some embodiments, comprise a processor, a virtual processor executing on a real processor, a combination of real processors and virtual processors, etc., that can enable interaction with data "stored in a doubly mapped cluster," e.g., a data representation corresponding to real data stored on one or more real clusters. The data stored in a doubly mapped cluster can actually correspond to real data stored on a portion of a disk of a node of a real cluster, but can be interacted with according to a logical relation, e.g., to a representation said to be 'stored in the doubly mapped cluster.' As such, writing data into a logical address of the doubly mapped cluster can result in writing of the data into a physical data storage element addressed in the real cluster and an association between the doubly mapped cluster address and the real cluster address can be retained to allow other operations with the data, e.g., via operations directed to the logical representation but performed on the real data. In an aspect, the retention of the real-to-mapped address relationship, e.g., doubly mapped data corresponding to the real data, etc., can be via nearly any technique, for example, via a mapping table, via a data structure, etc., and all such techniques are within the scope of the present disclosure. Additionally, the relationship is typically updatable, allowing, for example, movement of data at the real cluster to still relate to an unchanged doubly mapped address, allowing movement of the doubly mapped data to still relate to unmoved data at the real address, etc. As an example, where a node of a real cluster fails, the relationship to the doubly mapped address can be updated to associate a redundant duplicate of the data of the real cluster to be associated with the doubly mapped address, thereby allowing a user of the doubly mapped cluster to operate on the data without disturbance. As another example, moving data in a doubly mapped cluster environment can be decoupled from actually moving the data within the real cluster, e.g., the updated doubly mapped address can be affiliated with the unchanged real address, etc. As a further example, a failure of a doubly mapped node, which is not related to a failure of a real node, can be compensated for by providing access to the real data at the unhanged real cluster address via a redundant doubly mapped cluster node. Numerous other examples of doubly mapped RAIN technology are readily appreciable and are considered within the scope of the present disclosure even where not recited for clarity and brevity.

Other aspects of the disclosed subject matter can provide additional features generally not associated with real cluster data storage. In some embodiments, a doubly mapped cluster can comprise storage space from more than one real cluster. In some embodiments, a doubly mapped cluster can comprise storage space from real nodes in different geographical areas. In some embodiments, a doubly mapped cluster can comprise storage space from more than one real cluster in more than one geographic location. As an example, a doubly mapped cluster can comprise storage space from a cluster having hardware nodes in a data center in Denver. In a second example, a doubly mapped cluster can comprise storage space from a first cluster having hardware nodes in a first data center in Denver and from a second cluster also having hardware nodes in the first data center in Denver. As a further example, a doubly mapped cluster can comprise storage space from both a cluster having hardware nodes in a first data center in Denver and a second data center in Denver. As a further example, a doubly mapped cluster can comprise storage space from a first cluster having hardware nodes in a first data center in Seattle, Wash., and a second data center having hardware nodes in Tacoma, Wash. As another example, a doubly mapped cluster can comprise storage space from a first cluster having hardware nodes in a first data center in Houston, Tex., and a second cluster having hardware nods in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a doubly mapped redundant array of independent nodes, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Moreover, each real storage device can comprise one or more extents. An extent can be a defined portion of the real storage device, e.g., a real disk can be logically divided into extents, and the extents can comprise data storage locations that can facilitate data operations according to the storage locations. It is noted that a disk of a stated size can typically comprise less than the stated size of useable storage, a common convention, wherein a portion of the stated size is generally reserved for operational overhead, e.g., a 4 TB drive may have less than 4 TB of useable storage where the drive uses a portion of the 4 TB for a basic input output system (BIOS), etc. Accordingly, the extents of a disk can also differ from the stated size for similar reasons. In an aspect, extents can be of a unit size, for example, an extent can be 500 gigabytes (GB), such that a 5 terabyte (TB) disk can comprise 10 extents and an 8 TB disk can comprise 16 extents, again, as noted herein, the extents may not be exactly 500 GB due to some of the stated disk space being otherwise allocated, but the extents can be of the same unit size. This can enable a real cluster to support doubly mapped clusters corresponding to extents of real disks, rather than whole real disks, wherein the doubly mapped cluster can employ, e.g., correspond to, part of a real disk. Moreover, this extent unit size can enable use of different sized real disks in the real cluster without complicating allocation of storage space in the doubly mapped cluster. As an example, in a singly mapped cluster, whole real disks are mapped, e.g., a mapped disk corresponds to a whole real disk and, accordingly, it can be more complex to allocate a mapped cluster based on a real cluster having mixed disk sizes, for example, because this ca result in different sizes of mapped disks that can complicate redundant data storage in the mapped cluster construct. In contrast, with doubly mapped cluster technology, different sizes of real disks in a real cluster is immaterial because the doubly mapped cluster maps to equal sized extents and redundant data storage can therefore be less complex. As an example, if a real node comprises a 1 TB drive and an 8 TB drive, then a mapped node can comprise a 1 TB mapped drive and an 8 TB mapped drive which can complicate redundant storage because loss of one of the mapped drives can result in data loss unless more complex redundant data storage techniques are employed to preserve data in case of a lost mapped drive. In this example, if doubly mapped cluster technology is employed with a 1 TB extent size, then there can be 9 extents in the real drives and a doubly mapped cluster can comprise two four extent doubly mapped disks allowing for less complex data redundant storage techniques to be employed. Additionally, for this example, the granular size is 9 TB in the singly mapped cluster, and can be as low as 2 TB in the doubly mapped cluster.

In system 100, cluster storage construct 102 can receive data for storage in a mapped cluster, e.g., data for storage in RAIN cluster storage system 104, etc., hereinafter data 104 for brevity. Data 104 can be stored by portions of the one or more storage devices of cluster storage construct 102 according to a logical mapping of the storage space, e.g., according to one or more doubly mapped clusters. In an aspect, a doubly mapped cluster can be a logical allocation of storage space comprised in cluster storage construct 102. In an embodiment, a portion, e.g., addressable storage element, of an extent of a real disk can be comprised in a real disk that can be comprised in a real node that can be comprised in a real cluster and, furthermore, an addressable storage element of the real cluster can correspond to a portion of a doubly mapped cluster, etc. Accordingly, in an embodiment, cluster storage construct 102 can support a doubly mapped cluster enabling data 104 to be stored on one or more addressable storage element of an extent, e.g., first extent component 150 through L-th extent 158, of a real disk, e.g., first disk 130 through M-th disk component 138 of a real cluster, e.g., first cluster node component 120 through N-th cluster node component 128 of a cluster storage component (CSC), e.g., first CSC 110 through P-th CSC 118, and correspond to a doubly mapped cluster schema. Whereas each disk comprises extents, e.g., first disk component 130 comprises first extent component 150 through L-th extent component 158, first disk component 140 comprises first extent component 160 through L-th extent component 168, etc., the total number of extents of cluster storage construct 102 can be determined by summing the number of extents in each disk of each node of each cluster for all clusters, nodes, and disks, e.g., for a single cluster system, an 8×8×8 cluster can have 512 extents of a determined size. In an aspect, a mapped cluster control component, e.g., mapped cluster control component 220, etc., can coordinate storage of data 104 on storage elements of a real cluster of cluster storage construct 102 according to relationships between the mapped data storage space and the real data storage space, e.g., mapped cluster control component 220, etc., can indicate where in cluster storage construct 102 data 104 is to be stored, cause data 104 to be stored at a location in cluster storage construct 102 based on a mapping of the mapped cluster, etc.

In an embodiment, a doubly mapped cluster built on top of cluster storage construct 102 can correspond to one or more portions of one or more real cluster, e.g., to a portion of an extent of one or more disks of one or more nodes of one or more real clusters. Moreover, the mapped cluster can be N' nodes by M' disks by L' extents in size and the one or more real clusters of cluster storage construct 102 can be N nodes by M disks by L extents in size.

In some embodiments, a doubly mapped cluster can correspond to storage space from more than one real cluster, e.g., first CSC 110 through P-th CSC 118 of cluster storage construct 102. In some embodiments, a doubly mapped cluster can correspond to storage space from real nodes in different geographical areas. In some embodiments, a doubly mapped cluster can correspond to storage space from more than one real cluster in more than one geographic location. As an example, a doubly mapped cluster can correspond to storage space from a cluster having hardware nodes in a data center in Denver, e.g., where first CSC 110 is embodied in hardware of a Denver data center. In a second example, a doubly mapped cluster can correspond to storage space from a first cluster having hardware nodes in a first data center in Denver and from a second cluster also having hardware nodes in the first data center in Denver e.g., where first CSC 110 and P-th CSC 118 are embodied in hardware of a Denver data center. As a further example, a doubly mapped cluster can correspond to storage space from both a cluster having hardware nodes in a first data center in Denver and a second data center in Denver e.g., where first CSC 110 is embodied in first hardware of a first Denver data center and where P-th CSC 118 is embodied in second hardware of a second Denver data center. As a further example, a doubly mapped cluster can correspond to storage space from a first cluster having hardware nodes in a first data center in Seattle, Wash., and a second data center having hardware nodes in Tacoma, Wash., e.g., where first CSC 110 is embodied in first hardware of a first Seattle data center and where P-th CSC 118 is embodied in second hardware of a second Tacoma data center. As another example, a doubly mapped cluster can correspond to storage space from a first cluster having hardware nodes in a first data center in Houston, Tex., and a second cluster having hardware nods in a data center in Mosco, Russia e.g., where first CSC 110 is embodied in first hardware of a first Houston data center and where P-th CSC 118 is embodied in second hardware of a second Mosco data center.

In an aspect, a mapped cluster control component, e.g., 220, etc., can allocate storage space of cluster storage component 102 based on an indicated level of granularity. In an aspect, this indicated level of granularity can be determined based on an amount of data to store, a determined level of storage space efficiency for storing data 104, a customer/subscriber agreement criterion, an amount of storage in cluster storage construct 102, network/computing resource costs, wherein costs can be monetary costs, heat costs, energy costs, maintenance costs, equipment costs, real property/rental/lease cost, or nearly any other costs. In an aspect, these types of information can be termed 'supplemental information', e.g., 222, 322, etc., and said supplemental information can be used to allocate mapped storage space in a doubly mapped cluster and the corresponding space in a real cluster storage construct 102. In some embodiments, allocation can be unconstrained, e.g., any space of cluster storage component 102 can be allocated into a doubly mapped cluster. In other embodiments, constraints can be applied, e.g., a constraint can be employed by a doubly mapped cluster control component to select or reject the use of some storage space of cluster storage construct 102 when allocating a doubly mapped cluster. As an example, see FIG. 4 thorough FIG. 6, a first constraint can restrict allocating two doubly mapped clusters that each use a disk from the same real node because difficulty accessing the real node can result in effects on two doubly mapped clusters, a second constraint can restrict allocating two doubly mapped disks of one doubly mapped cluster from using extents from the same real disk because difficulty accessing the real disk can result in effects on the two doubly mapped disks. Other constraints can be readily appreciated, for example, based on a type of data redundancy schema, based on available/use storage space, based on network/computing resource costs, etc., and all such constraints are within the scope of the instant disclosure even where not recited for clarity and brevity.

Figure 2:
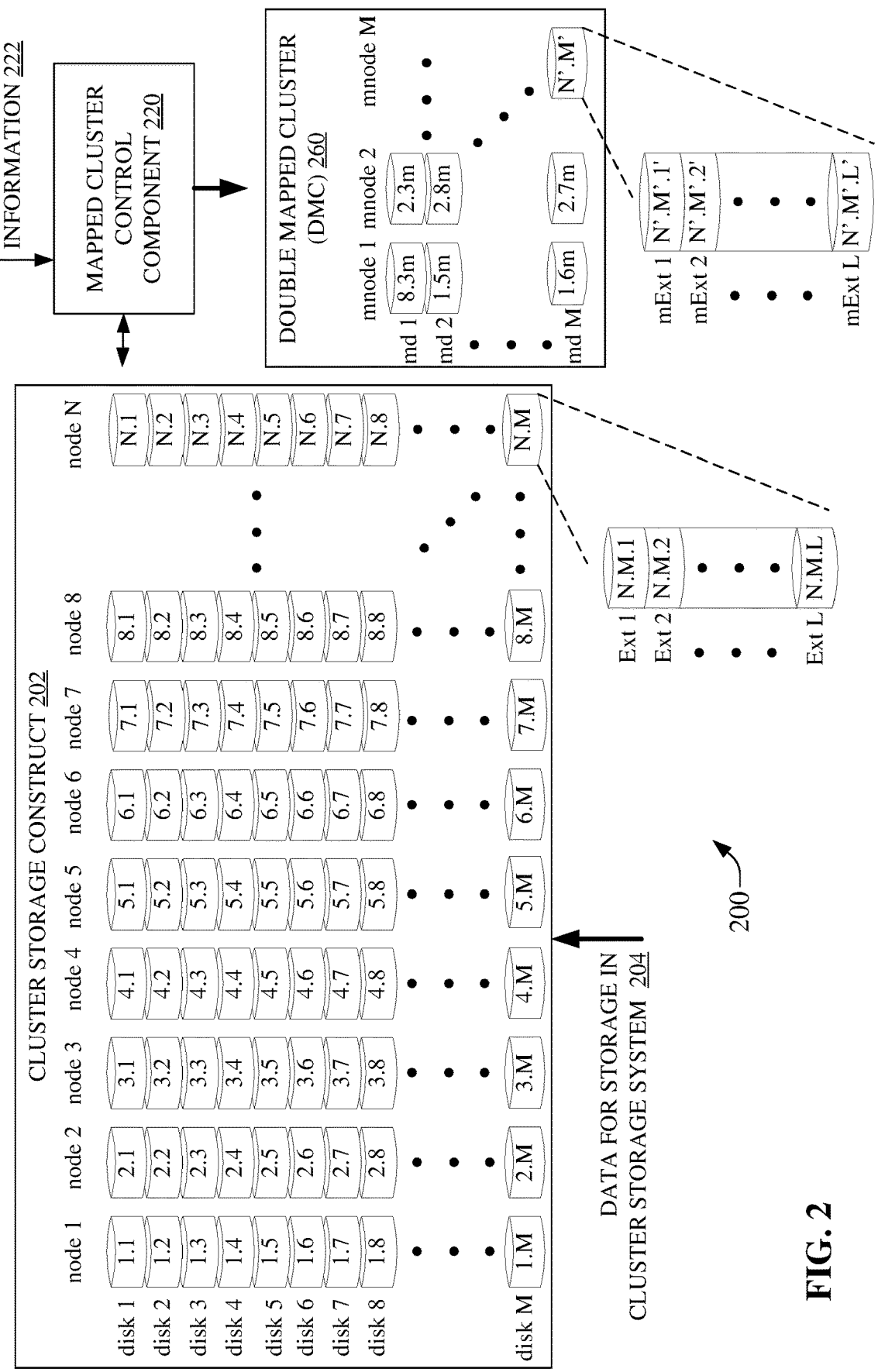
FIG. 2 is an illustration of an example system that can facilitate storage of data via a doubly mapped cluster in a doubly mapped redundant array of independent nodes, in accordance with aspects of the subject disclosure.

FIG. 2 is an illustration of a system 200, which can enable storage of data via a doubly mapped cluster in a doubly mapped redundant array of independent nodes, in accordance with aspects of the subject disclosure. System 200 can comprise cluster storage construct 202 that can be the same as, or similar to, cluster storage construct 102. Cluster storage construct 202 is illustrated at the disk and node level for ease of illustration, e.g., disk 1.1 indicates disk 1 of node 1. As used herein, the disk, node, and extent is depicted as N.M.L, N'.M'.L', etc., such that, for example, data stored at 1.1.1 is stored at an addressable storage location of node 1, disk 1, extent 1, data stored at 4.3.8 is stored at an addressable storage location of node 4, disk 3, extent 8, etc. As is illustrated in system 200, cluster storage construct 202 can comprise N nodes of M disks, e.g., disk 1.1 to N.M, etc. Moreover, each of the M disks of the N nodes can comprise L extents, see the flyout of disk N.M of cluster storage construct 202 that comprises L extents, e.g., N.M.1 through N.M.L.

Mapped cluster control component 220 can be communicatively coupled to, or be included in, cluster storage construct 202. Mapped cluster control component 220 can allocate doubly mapped cluster (DMC) 260, which can logically embody storage comprised in cluster storage construct 202. In an embodiment, DMC 260 can be allocated based on supplemental information 222. As an example, supplemental information 222 can indicate a first amount of storage is needed and mapped cluster control component 220 can determine a number of, and identity of, extents of disks of nodes of cluster storage construct 202 to meet the first amount of storage. Mapped cluster control component 220, in this example, can accordingly allocate the identified extents, disks, and nodes of cluster storage construct 202 as corresponding to doubly mapped nodes (mnode, mn, etc.), disks (mdisk, md, etc.), and extents (mextent, mExt, etc.) of DMC 260, e.g., extents of disk 8.3m can correlate to an allocation of extents of disk 8.3, . . . , extents of disk N'.M' can correlate to an allocation of disk N.M, etc. As such, similar to a real cluster, e.g., cluster storage construct 202, etc., DMC 260 can comprise mapped extents, for example, see flyout of doubly mapped disk N'.M' comprising mapped extents mExt 1 through mExt L, e.g., N'.M'.1' through N'.M'.L'.

Mapped cluster control component 220 can facilitate storage of data 204, corresponding to data representations of DMC 260, in the allocated storage areas of cluster storage construct 202. As such, data 204 can be stored in a more granular storage space than would conventionally be available, e.g., conventionally all disks of a node can be committed to storage, e.g., a client device is conventionally 'given' a whole real node to use, even where the 1 to M disks available in the whole real node can far exceed an amount of storage space needed by the client device. As such, by mapping portions of extents of some disks from some nodes into DMC 260, a lesser amount of storage space can be made available to the client device, for example, rather than allocating a whole real node under conventional technology, with doubly mapped RAIN technology a single extent of a single disk of a single node can be allocated, which can be significantly less storage space than the whole node. As an example, where a conventional storage cluster can allocate a minimum block of 1.2 petabytes (PB), for example in a conventional ECS storage system 1.2PB can be the minimum storage size, this can far exceed demands of a client device in many situations. Continuing the example, a singly mapped RAIN can allocate at a whole disk level and can reduce the minimum storage size considerably. Still further in the example, doubly mapped RAIN can allocate storage at the extent level to provide still further granularity of storage space and reduce the minimum allocated space even beyond singly mapped RAIN technology. As an example, where storage can be related to storing a simple log file, storing the log file in 1.2PB of space can be extremely inefficient use of space. Similarly, in this example, even storing the log file in several TB of disk space can be highly inefficient use of storage space. As such, allocation of storage space at the disk extent level can provide levels of granularity that are much more storage space efficient.

Figure 3:
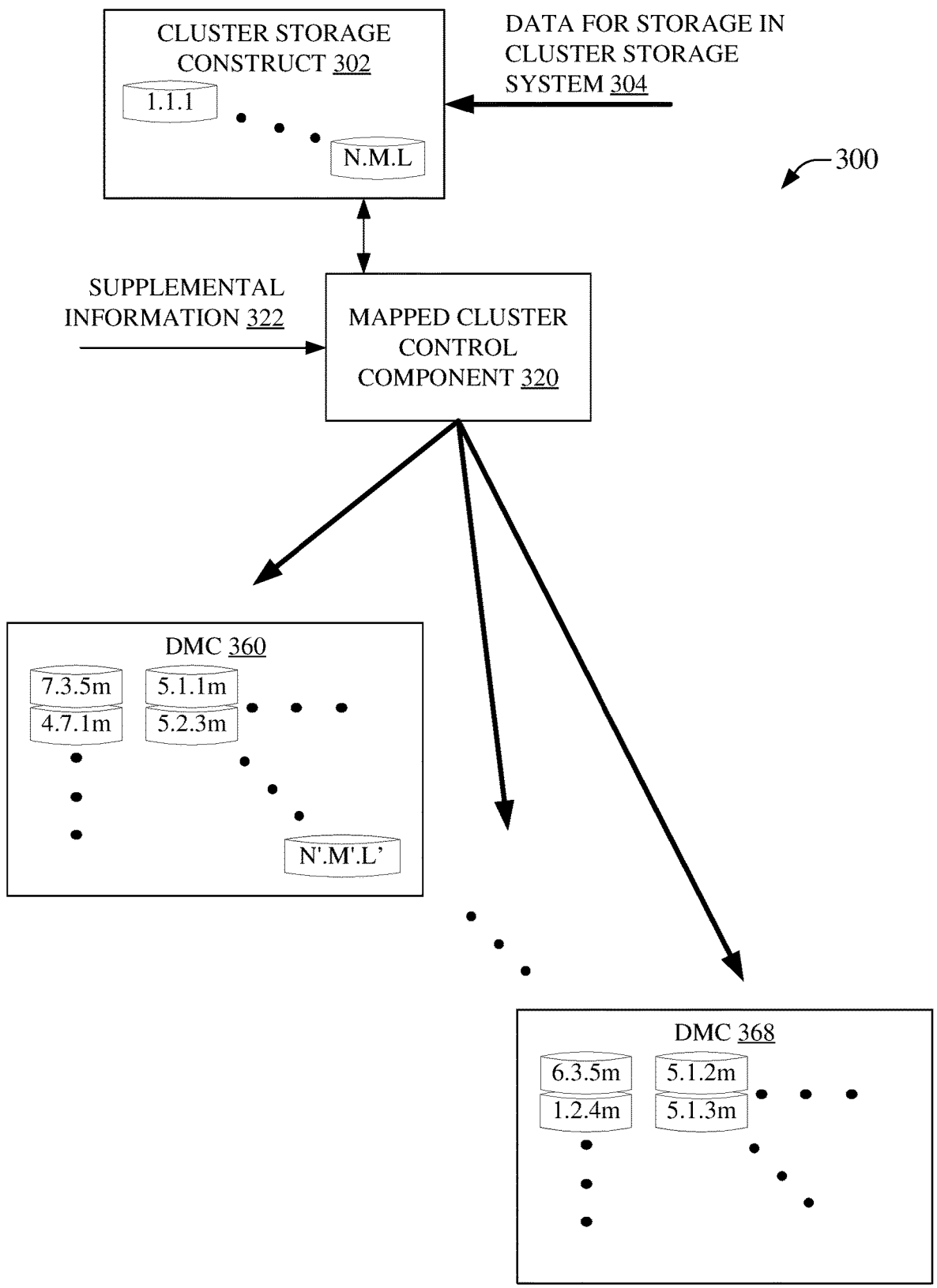
FIG. 3 is an illustration of an example system that can enable storage of data in a plurality of doubly mapped clusters, in accordance with aspects of the subject disclosure.

FIG. 3 is an illustration of a system 300, which can facilitate storage of data in a plurality of doubly mapped clusters, in accordance with aspects of the subject disclosure. System 300 can comprise cluster storage construct 302 that can comprise disk portions 1.1.1 to N.M.L in a manner that is the same as, or similar to, cluster storage construct 102, 202, etc. Mapped cluster control component 320 can allocate real data storage, e.g., via cluster storage construct 302, and logical data storage, e.g., via one or more DMC, for example, DMC 360-368, etc. In an embodiment, allocation of real and logical storage space can be based on supplemental information 322 received by mapped cluster control component 320.

Doubly mapped cluster 360 can comprise, for example, mapped nodes comprising mapped disk extents, e.g., mapped disk extents 7.3.5m, 4.7.1m, 5.1.1m, 5.2.3m, . . . , N'.M'.L', etc. Similarly, doubly mapped cluster 368 can comprise mapped nodes comprising mapped disk extents, for example, mapped disk extents 6.3.5m, 1.2.4m, 5.1.2m, 5.1.3m, etc. The example mapped disk extents can correspond to real disk extents with the same indicated node, disk, and extents number but without the 'm' designation. These mapped disk extents therefore can be mapped back to corresponding real disk extents of real disks of real nodes, comprised in a real cluster, e.g., cluster storage construct 302, e.g., 7.3.5m of DMC 360 can map to extent 5 of disk 3 of node 7, e.g., 7.3.5 of cluster storage construct 302, etc. Incoming data for storage, e.g., first data 304, etc., can then be stored at cluster storage construct 302 according to the mapping of DMC 360-368 based on one or more indications from mapped cluster control component 320, e.g., mapped cluster control component 320 can orchestrate or facilitate storage of first data 304, etc., into a real cluster according to the corresponding portion of DMC 360-368, etc.

In an embodiment, the size of DMC 360 can be the same or different from the size of other DMCs, e.g., through DMC 368. As an example, DMC 360 can be allocated based on a first amount of storage, related to storing first data 304, and DMC 368 can be allocated based on a second amount of storage, related to storing other data. In an aspect, the corresponding amounts of storage can be indicated via supplemental information 322, can be based on data 304 itself, etc. Moreover, in an embodiment, the size of a DMC, e.g., DMC 360-368, etc., can be dynamically adapted by mapped cluster control component 320, e.g., as data 304 transitions a threshold level, such as an amount of space occupied in DMC 360, an amount of unused space in DMC 360, etc., disk portions can be added to, or removed from DMC 360 by mapped cluster control component 320, e.g., adding new doubly mapped extents that correspond to real cluster extents, etc. Additionally, adjusting the size of a DMC can be based on other occupancy of cluster storage construct 302 storage space, e.g., changes in storage space consumed by DMC 368, etc., can result in changes to the size of DMC 360, e.g., adding extents corresponding to cluster storage construct 302, removing extents corresponding to cluster storage construct 302, etc. In some embodiments, the storage space of storage construct 302 itself can be altered, e.g., adding/removing new/old nodes, disks, etc., that can facilitate changes in doubly mapped space on a DMC. As an example, where DMC 368 uses 90% of cluster storage construct 302, the maximum size of DMC 360 can be limited to about 10% by mapped cluster control component 320. As another example, where additional real disks are added to cluster storage construct 302, for example doubling the storage space thereof, mapped cluster control component 320 can correspondingly increase the size of DMC 360 beyond the example 10%. As a further example, where a customer downgrades a storage plan, a lower amount of storage space purchased can be indicated in supplemental information 322 and mapped cluster control component 320 can correspondingly reduce the storage space, e.g., remove extents, disks, nodes, etc., from DMC 360-368, etc.

In some embodiments, mapped cluster control component 320 can allocate extents, disks, nodes, based on other supplemental information 322. As an example, where cluster storage construct 302 comprises high cost storage and low cost storage, where cost can be monetary or non-monetary costs such as energy consumption, access speeds, etc., mapped cluster control component 320 can rank the available storage, for example by cost. This can enable mapped cluster control component 320, for example, to allocate low cost storage into DMC 360-368 before allocating more costly storage. In another example, a rank can allow mapped cluster control component 320 to allocate higher cost storage, such as where cost corresponds to speed of access, reliability, etc., to accommodate clients that are designated to use the higher ranked storage space, such as a client that pays for premium storage space can have their data stored in an DMC that comprises higher ranked storage space.

Figure 4:
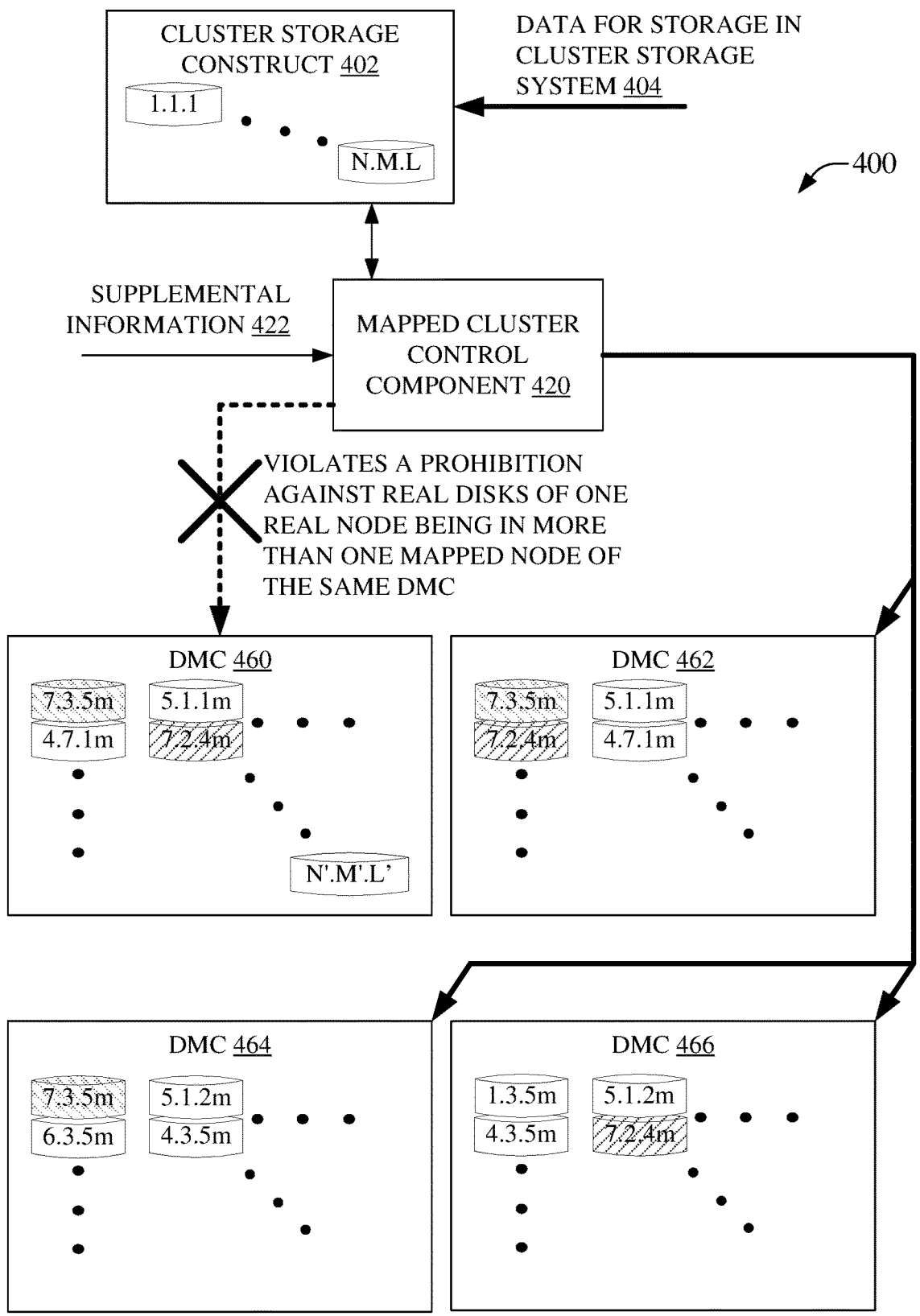
FIG. 4 illustrates an example system that can facilitate storage of data via a doubly mapped redundant array of independent nodes in accord with a first data protection rule, in accordance with aspects of the subject disclosure.

FIG. 4 is an illustration of a system 400, which can enable storage of data via a doubly mapped redundant array of independent nodes in accord with a first data protection rule, in accordance with aspects of the subject disclosure. System 400 can comprise cluster storage construct 402 that can comprise disk portions 1.1.1 to N.M.L in a manner that is the same as, or similar to, cluster storage construct 201, 202, 302, etc. Mapped cluster control component 420 can allocate one or more DMC, for example, according to supplemental information 422, data 404, etc. In an aspect, allocation of a DMC, and the corresponding portion of a real cluster, can be subject to rules, best practices, etc.

In an embodiment, mapped cluster control component 420 can validate a prospective DMC before allocation, e.g., the DMC can be determined to satisfy a rule, comport with a best practice, etc. In an embodiment the rule, best practice, etc., hereinafter 'rule' for the sake of brevity, can be related to data protection. As an example, redundant data storage techniques employed in a DMC can allow for loss of a mapped node without experiencing a data loss event, e.g., the data of the mapped cluster is sufficiently redundant to be resilient against the loss of a mapped node. It will be noted that the loss of a mapped node, e.g., due to a storage service of the DMC failing, performing poorly, etc., may not correspond to loss of real data stored on a real cluster, e.g., a storage service for the mapped node can stall, thereby preventing access to the mapped data relationships that correspond to the real data stored on the real cluster without actual loss of the data stored on the real cluster. Once the storage service is restarted, it can be possible to again access the real data. However, while the mapped node is in a state that limits access to the mapped data relationships, etc., the DMC can, for example, 'fail over' to a redundant copy of the mapped data to allow access to redundant real data on the real cluster. Accordingly, in this example where the DMC is resilient against the loss of one mapped node, the rule can prohibit disks/extents of one real node being mapped to two mapped nodes because the failure of one real node, e.g., wherein access to real data stored on the one real node as distinct from a mapped node failure, can result in access to the data becoming limited for two mapped nodes. As an example, proposed DMC 460 can comprise a first mapped node comprising 7.3.5m and 4.7.1m and a second mapped node comprising 5.1.1m and 7.2.4m of the N'.M'.L' extents comprising DMC 460. Proposed DMC 460 therefore can be seen to include disks/extents from one real node, e.g., real node 7 in two mapped nodes, e.g., the first and second mapped nodes of proposed DMC 460. As such, if real node 7 becomes less accessible, e.g., fails, etc., then both the first and second node of proposed DMC 460 can become less accessible and can result in a data loss event where DMC 460 is structured to be resilient to the loss of only one mapped node. Accordingly, allocation of DMC 460 can be prohibited where it can be determined to not satisfy a rule relating to data protection.

In contrast, DMC 462 can comprise a different mapping to the same real extents that were comprised in proposed DMC 460, e.g., the first mapped node can be mapped to comprise 7.3.5m and 7.2.4m and the second mapped node can be mapped to comprise 5.1.1m and 4.7.1m. It can be observed that the failure of real node 7 can now have a more limited effect on DMC 462 than compared to DMC 460, e.g., only the first mapped node of DMC 462 may be affected by the loss of real node 7 in contrast to the loss of two mapped nodes in DMC 460. As such, DMC 462 can be deemed to satisfy the rule related to data protection and can be a permitted allocation.

Similarly, the allocation or creation of a pair of DMCs, e.g., DMC 464 and 466, can result in a first mapped node comprising 7.3.5m, e.g., in DMC 464, and a second mapped node comprising 7.2.4m, e.g., in DMC 466, however these mapped nodes, unlike in DMC 460, are located in different mapped clusters, e.g., DMC 464 and DMC 466. As such, failure of real node 7 may result in the first mapped node of DMC 464 being less accessible and the second mapped node of DMC 466 being less accessible, but in this example, each of DMC 464, and DMC 466 can be resilient to the loss of one mapped node each. As such, the creation of DMC 464, DMC 466, etc., can be determined to satisfy the rule related to data protection and can be permitted allocations.

Figure 5:
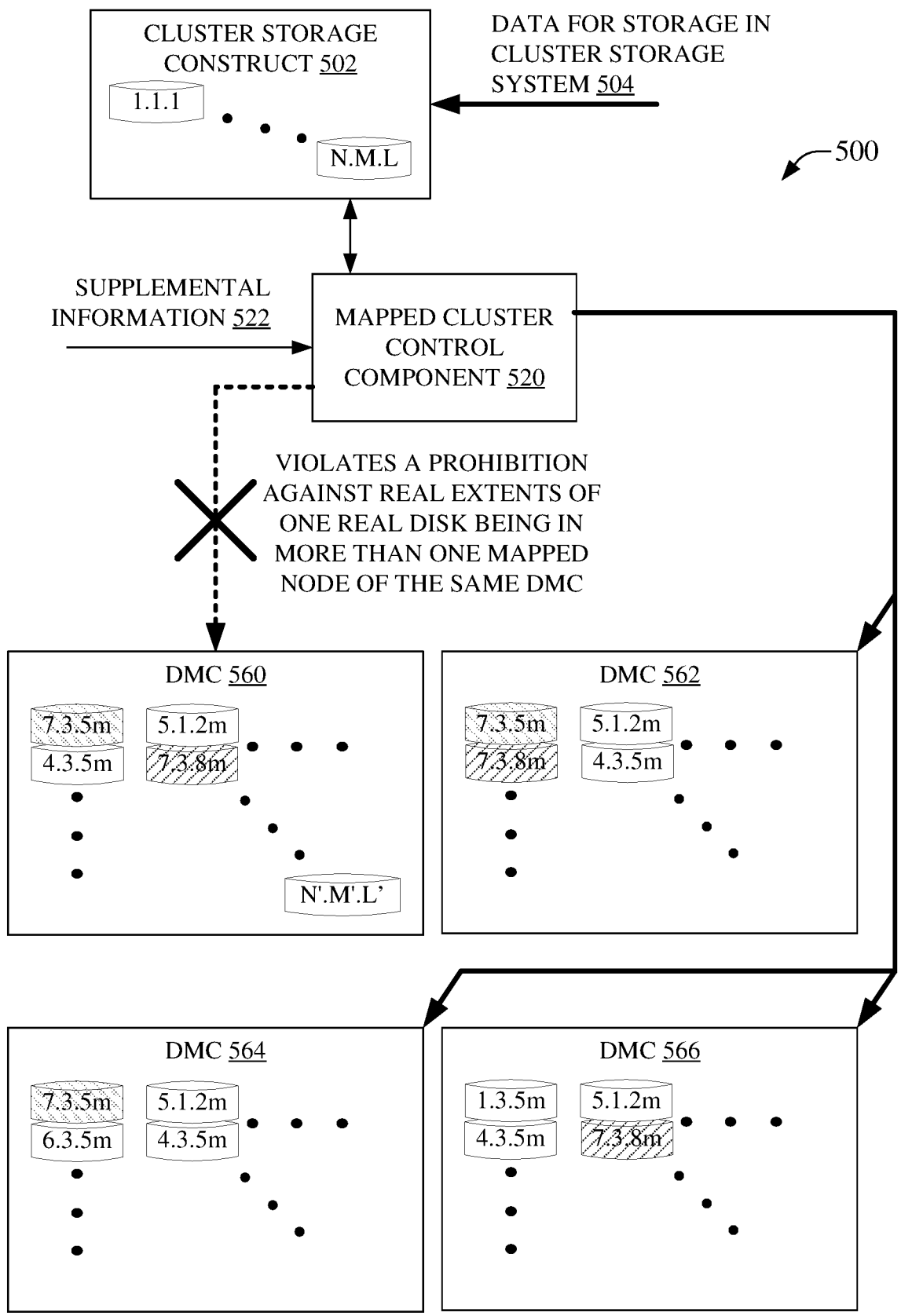
FIG. 5 illustrates an example system that can facilitate storage of data via a doubly mapped redundant array of independent nodes in accord with a second data protection rule, in accordance with aspects of the subject disclosure.

FIG. 5 is an illustration of a system 500, which can enable storage of data via a doubly mapped redundant array of independent nodes in accord with a second data protection rule, in accordance with aspects of the subject disclosure. System 500 can comprise cluster storage construct 502 that can comprise disk portions 1.1.1 to N.M.L in a manner that is the same as, or similar to, cluster storage construct 201, 202, 302, 402, etc. Mapped cluster control component 520 can allocate one or more DMC, for example, according to supplemental information 522, data 504, etc. As in system 400, allocation of a DMC in system 500, and the corresponding portion of a real cluster, can be subject to rules, best practices, etc.

In an embodiment, mapped cluster control component 520 can validate a prospective DMC before allocation, e.g., the DMC can be determined to satisfy a rule, for example related to a different aspect of data protection than illustrated in system 400. Returning to the example DMC employing redundant data storage techniques that allow for loss of a single mapped node without experiencing a data loss event, doubly mapped clusters can also apply a rule prohibiting the use of two real extents of a disk of a real node from being employed in two mapped nodes of a DMC, because the failure of one real disk may then affect two mapped nodes of the DMC and can result in a data loss event. As an example, proposed DMC 560 can comprise a first mapped node comprising 7.3.5m and 4.3.5m and a second mapped node comprising 5.1.2m and 7.3.8m of the N'.M'.L' extents comprising DMC 560. Proposed DMC 560 therefore can be seen to include extents from one real disk, e.g., real disk 3 of real node 7, in two mapped nodes, e.g., the first and second mapped nodes of proposed DMC 560. As such, if real disk 3 of real node 7 becomes less accessible, e.g., fails, etc., then the extents of real disk 3 real node 7, e.g., extent 5 and extent 8, can also become less accessible and both the first and second node of proposed DMC 560 can therefore correspondingly become less accessible, which can result in a data loss event where DMC 560 is structured to be resilient to the loss of only one mapped node. Accordingly, allocation of DMC 560 can be prohibited where it can be determined to not satisfy a second rule relating to data protection.

In contrast, DMC 562 can comprise a different mapping to the same real extents that were comprised in proposed DMC 460, e.g., the first mapped node can be mapped to comprise 7.3.5m and 7.3.8m and the second mapped node can be mapped to comprise 5.1.2m and 4.3.5m. It can be observed that the failure of real disk 3 real node 7 can now have a more limited effect on DMC 562 than compared to DMC 560, e.g., only the first mapped node of DMC 562 may be affected by the loss of access to extent 5 and 8 or real disk 3 of real node 7, in contrast to the loss of two mapped nodes in DMC 560. As such, DMC 562 can be deemed to satisfy the second rule related to data protection and can be a permitted allocation.

Similarly, the allocation or creation of a pair of DMCs, e.g., DMC 564 and 566, can result in a first mapped node comprising 7.3.5m, e.g., in DMC 564, and a second mapped node comprising 7.3.8m, e.g., in DMC 466, however these mapped nodes, unlike in DMC 460, are located in different mapped clusters, e.g., DMC 564 and DMC 566. As such, failure of real disk 3 real node 7 may result in the first mapped node of DMC 564 being less accessible and the second mapped node of DMC 566 being less accessible, but in this example, each of DMC 564, and DMC 566 can be resilient to the loss of one mapped node each. As such, the creation of DMC 564, DMC 566, etc., can be determined to satisfy the rule related to data protection and can be permitted allocations.

Figure 6:
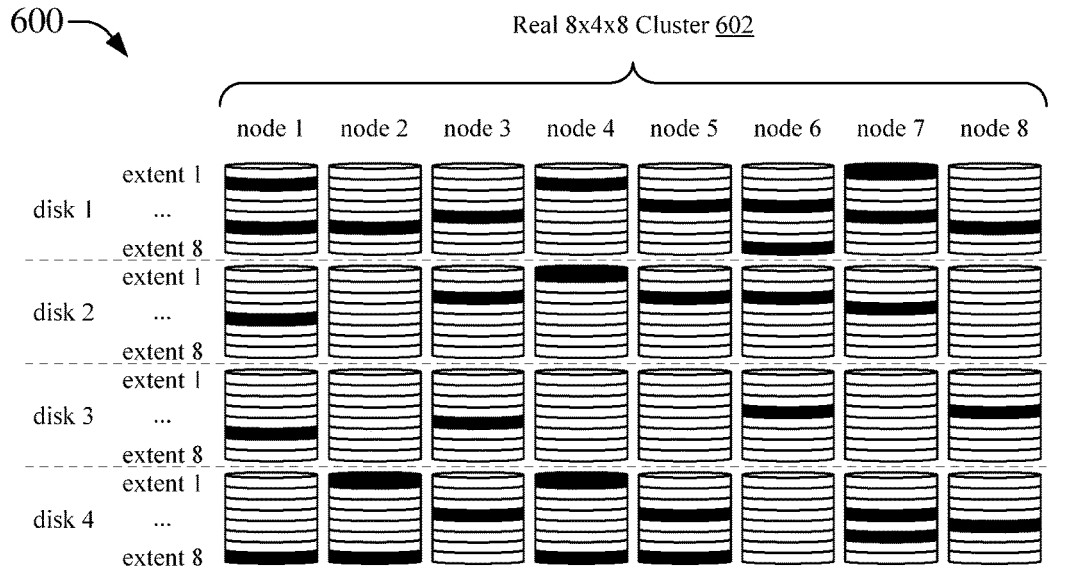
FIG. 6 illustrates an example system that can facilitate storage of data via a doubly mapped redundant array of independent nodes in accord with a first and second data protection rule, in accordance with aspects of the subject disclosure.

FIG. 6 is an illustration of a system 600 that can enable storage of data via a doubly mapped redundant array of independent nodes in accord with a first and second data protection rule, in accordance with aspects of the subject disclosure. System 600 can comprise real 8×4×8 cluster 602 that can comprise disk portions 1.1.1 to 8.4.8, e.g., 256 extents, in a manner that is the same as, or similar to, cluster storage construct 201, 202, 302, 402, 502, etc. A mapped cluster control component, e.g., 220-520, etc., can allocate one or more DMC. As in systems 400, 500, etc., allocation of a DMC in system 600, and the corresponding portion of a real cluster, can be subject to rules, best practices, etc.

In an embodiment, a prospective DMC can be validated before allocation, e.g., a DMC can be determined to satisfy one or more rules, for example related to aspects of data protection. Again employing an example DMC comprising redundant data storage techniques that allow for loss of a single mapped node without experiencing a data loss event, doubly mapped clusters can apply multiple rules, e.g., a first rule prohibiting the mapping of disks of one real node from being employed in more than one mapped node of a mapped cluster, a second rule prohibiting the mapping of two real extents of one disk of one real node from being employed in more than one mapped node of a DMC, etc., because these rules can provide mapped node topologies that can comport with data protection schemes of DMCs to be provisioned.

Application of the rules to real 8.4.8 cluster 602 can result in provisioning of DMC 660 and prohibiting the provisioning of DMCs 662-666, etc. As an example, the example illustrated mappings of 4×4×2 DMC 660 do not result in disks of any one real node of cluster 602 from being mapped to more than one node of DMC 660 and also do not result in extents of one disk of cluster 602 being mapped to mapped disks in more than one node of DMC 660. As such, the failure of either one node or of one disk and the constituent extents can be unlikely to affect more than one node of DMC 660 and therefore can comport with the data protection scheme of DMC 660 allowing for loss of one node without a data loss event.

In contrast, each of DMCs 662-666 can fail one or more rules, e.g., data protection rules, etc. IN DMC 662, for example, a first extent of a first mapped disk, e.g., MD1.EXT1, of each of mapped node 1, e.g., MN1, and mapped node 2, e.g., MN2 can correspond to a disk from a same real node, e.g., real node 1. Accordingly, failure of real node 1 can compromise two mapped nodes of DMC 662 and, therefore, DMC 662 can be determined to not satisfy an example first rule related to disks of one real node being prohibited in more than one mapped node of a mapped cluster, even though it can satisfy an example second rule related to extents of the same real disk being prohibited in more than one mapped node of a mapped cluster.

In proposed DMC 664, MD1.EXT1 of MN1 and MD1.EXT2 of MN2 can correspond to extents from a same real disk of cluster 602, e.g., 1.1.1m of DMC 664 can map to extent 5 of disk 3 of real node 1 and 2.1.2m can map to extent 8 of the same disk and real node of cluster 602. Accordingly, failure of disk 3 of real node 1 can result in the failure of both real extent 5 and 8, which can compromise mapped disk 1 of each of MN1 and MN2 of DMC 664. As such, DMC 664 can be determined to not satisfy the example second rule and can be determined to also not satisfy the example first rule. In an aspect, another rule, not illustrated, can prohibit mapping two real extents of a single real disk to different mapped disks in a single mapped node of a doubly mapped cluster, for example, where a data protection scheme of the doubly mapped cluster stores redundant data in different disks of a same mapped node, loss of a the real disk and the resulting loss of the extents thereof can result in loss of two mapped disks that can result in a data loss event.

In proposed DMC 666, MD1.EXT1 of MN1 and MD2.EXT1 of MN2 can correspond to extents from a same real disk of cluster 602, e.g., 1.1.1m of DMC 664 can map to extent 5 of disk 3 of real node 1 and 2.2.1m can map to extent 8 of the same disk and real node of cluster 602. Accordingly, failure of disk 3 of real node 1 can result in the failure of both real extent 5 and 8, which can compromise mapped disk 1 of MN1 and mapped disk 2 of MN2 in DMC 666. As such, DMC 666 can again be determined to not satisfy both the example first and example second rule even where the conflict occurs in different mapped disks of different mapped nodes.

Figure 7:
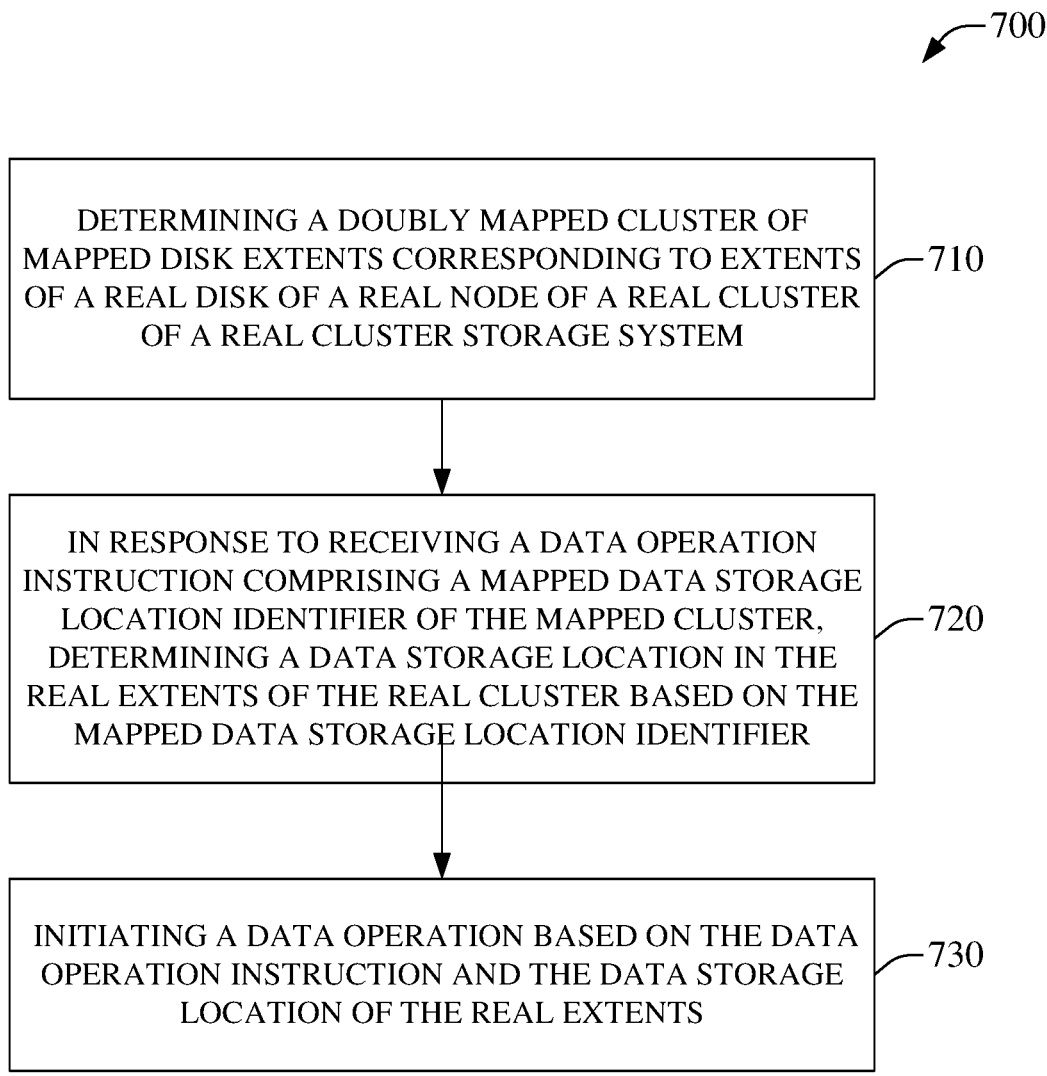
FIG. 7 is an illustration of an example method facilitating storage of data in a doubly mapped redundant array of independent nodes, in accordance with aspects of the subject disclosure.
Figure 8:
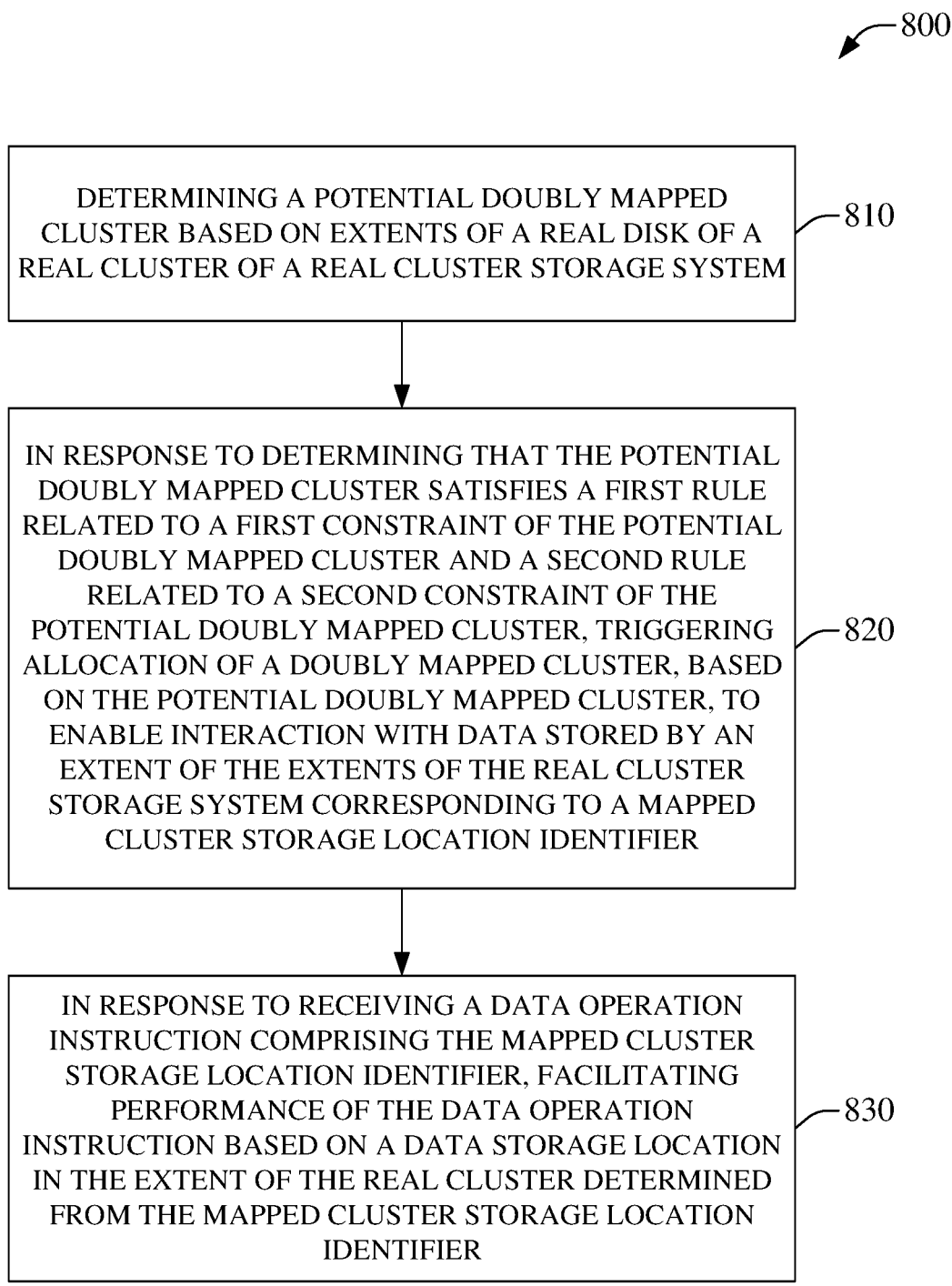
FIG. 8 illustrates an example method that enables storage of data via a doubly mapped redundant array of independent nodes in accord with a first and second data protection rule, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate storage of data in a doubly mapped redundant array of independent nodes, in accordance with aspects of the subject disclosure. At 710, method 700 can comprise determining a doubly mapped cluster of mapped disk extents. The mapped disk extents can correspond to extents of a real disk of a real node of a real cluster of a real cluster storage system. The determining can result in a doubly mapped cluster that can allow more granular use of storage space for real cluster(s) of the real cluster storage system than conventional techniques that can be based on entire real disks or entire real nodes of the real cluster storage system as disclosed herein. In an embodiment, a portion of an extent of a real disk can be comprised in a real node that can be comprised in a real cluster of a real cluster storage system and, furthermore, a portion of the extent of the real disk can correspond to a portion of a mapped extent of a mapped disk. A mapped disk can store data relationships that can enable data operations directed at a mapped datum to be propagated to a corresponding real datum stored on one or more portions of one or more extents of one or more real disks. As such, a doubly mapped cluster can be said to be built on top of a real cluster and the mapped extents can be logical representations of real data stored in the real extents of the real cluster(s). Accordingly, in an embodiment, real cluster storage system can support one or more doubly mapped clusters and can store real data on one or more real disk extents according to a relationship to doubly mapped data, e.g., real data can be stored on first extent component 150 through L-th extent component 158 of first disk component 130 through M-th disk component 138 of first cluster node component 120 of first CSC 110 through P-th CSC 118 of cluster storage component 102, first extent component 160 through L-th extent component 168 of first disk component 140 through M-th disk component 148 of N-th cluster node component 128 of first CSC 110 through P-th CSC 118 of cluster storage component 102, etc., and can correspond, according to the relationship, to a representation of doubly mapped data stored according to a mapped extent of a mapped disk of a mapped node of a doubly mapped cluster such as DMC 260, 360-368, 462-464, 562-566, 660, etc., which relationship can be indicated as a real address of N.M.L corresponds to a doubly mapped address of N'.M'.L'. A topology of a doubly mapped cluster, and the data relationships between real data and doubly mapped data, can be managed by a mapped cluster control component, e.g., 220-520, etc., which can coordinate storage of data and recordation of relationship parameters, access to data according the relationship parameters, data operations according to the relationship parameters, etc.

Accordingly, a doubly mapped cluster can be comprised in one or more portions of one or more real cluster. The doubly mapped cluster can be N' nodes by M' disks by L' extents in size and the one or more real clusters of cluster storage system can be N nodes by M disks by L extents in size. In an embodiment, N' can be less than or equal to N. In an embodiment, if N' is greater than N, this condition can result in a real disk of a real node being mapped to more than one mapped node of a doubly mapped cluster, which can be a vector for a data loss event and can be generally prohibited, e.g., because N' is greater than N in this embodiment, some disks of the N nodes will be mapped to more than one of the N' nodes and failure of one of the N nodes can therefore result in a corresponding failure of more than one of the N' nodes and can cause a data loss event. In N'>N embodiments, data redundancy techniques of the mapped cluster can be adapted to allow for loss of more than one mapped node without data loss, although this can be a more complex data redundancy technique than can be used in mapped clusters designed to be resilient against losses of single mapped nodes and, further, can also result in more of the mapped storage space being consumed for data redundancy than can be consumed in mapped clusters designed to be resilient against losses of single mapped nodes. In some embodiments, M' can be less than, equal to, or greater than, M. In some embodiments, L' can be less than, equal to, or greater than, L. In embodiments with M'>M, disks of different N real nodes can be mapped to the N' nodes such that M'>M, e.g., a mapped node can comprise mapped disks that correspond to real disks from more than one real node, for example one mapped node can have 8 mapped disks corresponding to four real disks of a first real node and four real disks of a second real node. In embodiments with L'>L, extents of different M real disks can be mapped to the M' mapped disks such that L'>L, e.g., a mapped disk can comprise mapped extents that correspond to real extents from more than one real disk, for example one mapped disk can have 16 extents corresponding to four real extents of each of four real disks of real nodes of a real cluster. In some embodiments, the doubly mapped cluster can be smaller than cluster storage system size, e.g., some combination of N'×M'×L' that is smaller than N×M×L, where N' is less than or equal to N for DMCs that are resilient to loss of one mapped node, etc. In some embodiments, a doubly mapped cluster can comprise relationships to storage space from more than one real cluster of the real cluster storage system. In some embodiments, a doubly mapped cluster can comprise relationships to storage space from real nodes in different geographical areas. In some embodiments, a doubly mapped cluster can comprise relationships to storage space from more than one real cluster in more than one geographic location.

At 720, method 700 can comprise determining a data storage location of a real extent of a real disk of a real node of a real cluster of the real cluster storage system. The determining can be in response to receiving a data operation instruction. The data operation instruction can comprise a mapped data storage location identifier for a mapped cluster, e.g., a logical representation of the real data mapped into the mapped cluster topography. The mapped data storage location identifier can correspond to the data storage location of the real extent of the real cluster storage system, e.g., the logical location of the data, e.g., represented in the data representation, can be mapped to the real location of the data. In embodiments, the relationship between a location of data on a real cluster and a logical location of data one a doubly mapped cluster can be stored in non-volatile memory, such as via a mapping table, data structure, etc., stored on a disk, flash memory, optical media, etc. Accordingly, a data operation directed to the mapped data can be propagated to real data according to a relationship between the logical data representation and the real data stored on the real cluster, e.g., the mapped data can be used to propagate a data operation onto data stored at a real data storage element of a real extent of a real cluster.

At 730, method 700 can comprise initiating a data operation based on the data operation of 720 and the data storage location in the real extent of the real cluster. At this point method 700 can end. In an aspect, the data storage location can be comprised in a real extent of a real disk of a real cluster of a real cluster storage system and can have a relationship to a data representation for data of a doubly mapped cluster. As such, data operations directed to doubly mapped data can be propagated to real data based on relationships between logical data storage locations and real data storage locations.

In an aspect, a doubly mapped cluster can be determined based on an indicated level of granularity. In an aspect, this indicated level of granularity can be determined based on an amount of data to store, a determined level of storage space efficiency for storing data, a customer/subscriber agreement criterion, an amount of storage in cluster storage system, network/computing resource costs, wherein costs can be monetary or other costs, etc. In some embodiments, determining the doubly mapped cluster can be subject to constraints, for example a first constraint against two doubly mapped nodes mapping to a node of one real node, a second constraint against two mapped nodes comprising mapped extents corresponding to real extents of a single real disk, etc. The constraints can be related to data protection schemes employed in a mapped cluster, e.g., a mapped cluster can be designed to be resilient against the loss of one or more mapped nodes, one or more mapped disks, one or more mapped extents, etc. Other constraints can be readily appreciated, for example, based on a type of data redundancy schema, based on available/use storage space, based on network/computing resource costs, etc., and all such constraints are within the scope of the instant disclosure even where not recited for clarity and brevity.

FIG. 8 is an illustration of an example method 800, which can enable storage of data via a doubly mapped redundant array of independent nodes in accord with a first and second data protection rule, in accordance with aspects of the subject disclosure. At 810, method 800 can comprise determining a potential doubly mapped cluster. The potential doubly mapped cluster can be based on extents of a real disk of a real cluster of a real cluster storage system. In an embodiment, real cluster storage system can support one or more doubly mapped clusters and can store real data on one or more real disk extents according to a relationship to doubly mapped data, e.g., real data can be stored on first extent component 150 through L-th extent component 158 of first disk component 130 through M-th disk component 138 of first cluster node component 120 of first CSC 110 through P-th CSC 118 of cluster storage component 102, first extent component 160 through L-th extent component 168 of first disk component 140 through M-th disk component 148 of N-th cluster node component 128 of first CSC 110 through P-th CSC 118 of cluster storage component 102, etc., and can correspond, according to the relationship, to a representation of doubly mapped data stored according to a mapped extent of a mapped disk of a mapped node of a doubly mapped cluster such as DMC 260, 360-368, 462-464, 562-566, 660, etc., which relationship can be indicated as a real address of N.M.L corresponds to a doubly mapped address of N'.M'.L'. A topology of a potential doubly mapped cluster, and potential data relationships between real data and doubly mapped data, can be managed by a mapped cluster control component, e.g., 220-520, etc. The potential doubly mapped cluster can be checked for compliance with data mapping constraints, e.g., one or more rules related to data protection, etc.

At 820, method 800 can comprise triggering allocation of a doubly mapped cluster based on the potential doubly mapped cluster in response to determining that the potential doubly mapped cluster satisfies mapping constraints, e.g., a first rule related to a first constraint of the potential doubly mapped cluster and a second rule related to a second constraint of the potential doubly mapped cluster, etc. As an example a first constraint can prohibit two doubly mapped nodes from mapping to a single node of a real node. As a further example, a second constraint can prohibit two mapped nodes from comprising mapped extents corresponding to real extents of a single real disk. The constraints can be related to data protection schemes employed in a mapped cluster, e.g., a mapped cluster can be designed to be resilient against the loss of one or more mapped nodes, one or more mapped disks, one or more mapped extents, etc. Other constraints can be readily appreciated, for example, based on a type of data redundancy schema, based on available/use storage space, based on network/computing resource costs, etc., and all such constraints are within the scope of the instant disclosure even where not recited for clarity and brevity. In an aspect, a doubly mapped cluster can be allocated according to the potential doubly mapped cluster where the potential doubly mapped cluster is determined to satisfy the first and second rule. In an embodiment, the potential doubly mapped cluster can provide a selectable level of granularity that can be embodied in an allocated doubly mapped cluster. The level of granularity can be selected in response to an indication of an amount of data to store, a determined level of storage space efficiency, a customer/subscriber agreement criterion, an amount of storage in cluster storage system, network/computing resource costs, wherein costs can be monetary or other costs, etc.

At 830, method 800 can comprise facilitating performance of a data operation instruction in response to receiving the data operation instruction. At this point method 800 can end. The data operation instruction can comprise a mapped storage location identifier. The performance of the data operation instruction can be based on a real data storage location in an extent of a real cluster, which can be determined from the mapped cluster storage location identifier. The real data storage location can be determined from the relationship between the real data storage location and the mapped cluster storage location identifier that can be stored in a data representation in the doubly mapped cluster. Whereas the data operation instruction can comprise a mapped data storage location identifier for a mapped cluster, e.g., a logical representation of the real data mapped into the mapped cluster topography, the mapped data storage location identifier can correspond to the data storage location of the real extent of the real cluster storage system, e.g., the logical location of the data, e.g., represented in the data representation, can be mapped to the real location of the data. In embodiments, the relationship between a location of data on a real cluster and a logical location of data one a doubly mapped cluster can be stored in non-volatile memory, such as via a mapping table, data structure, etc., stored on a disk, flash memory, optical media, etc. Accordingly, a data operation directed to the mapped data can be propagated to real data according to a relationship between the logical data representation and the real data stored on the real cluster, e.g., the mapped data can be used to propagate a data operation onto data stored at a real data storage element of a real extent of a real cluster.

Figure 9:
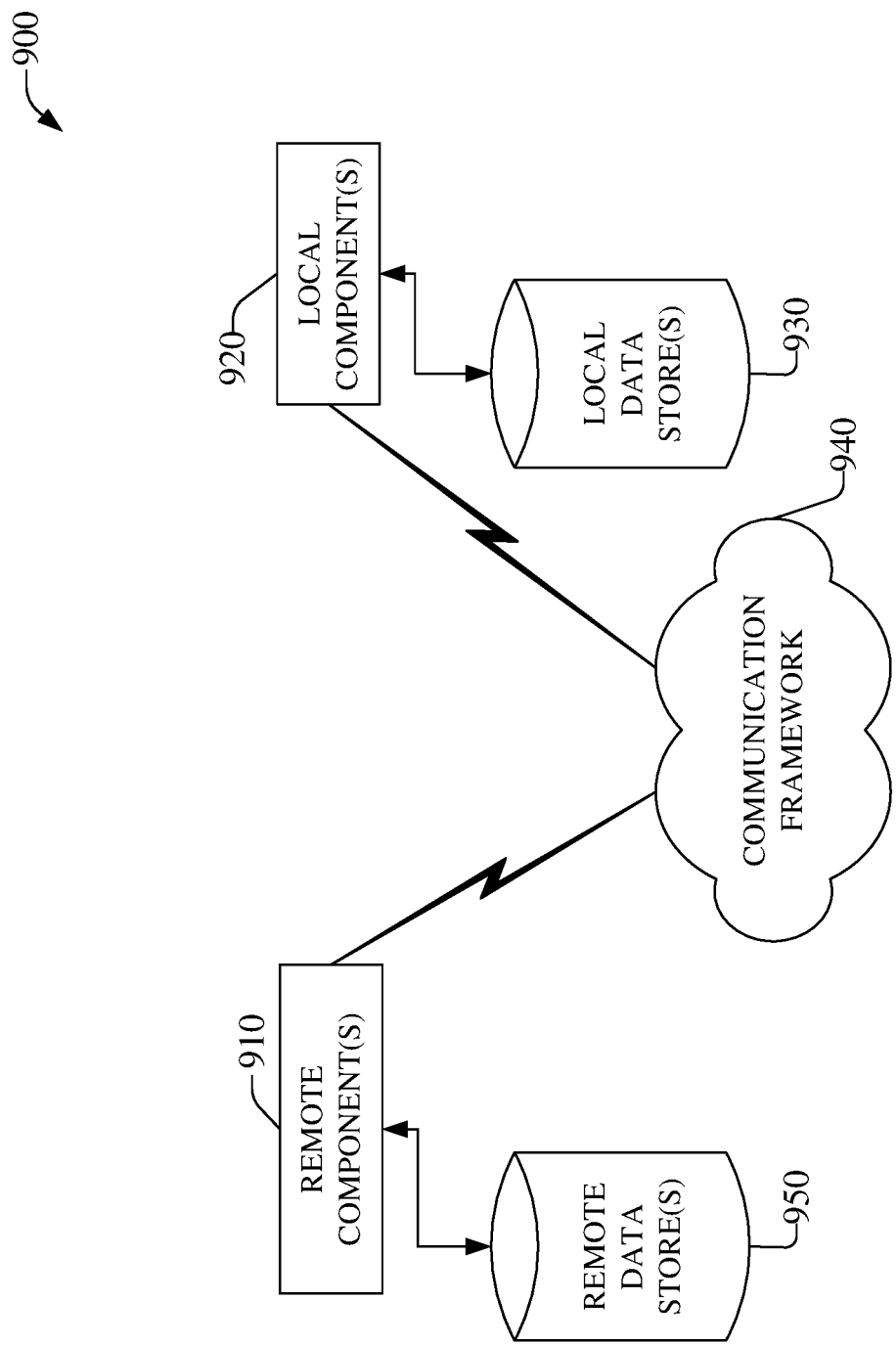
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., embodied in a cluster storage construct, such as 102-602, etc., connected to a local doubly mapped cluster, e.g., 260, 360-368, 460-466, 560-566, 660-666, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local doubly mapped cluster, e.g., 260, 360-368, 460-466, 560-566, 660-666, etc., connected to a remotely located storage device via communication framework 940. In an aspect the remotely located storage devices can be embodied in a cluster storage construct, such as 102-602, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
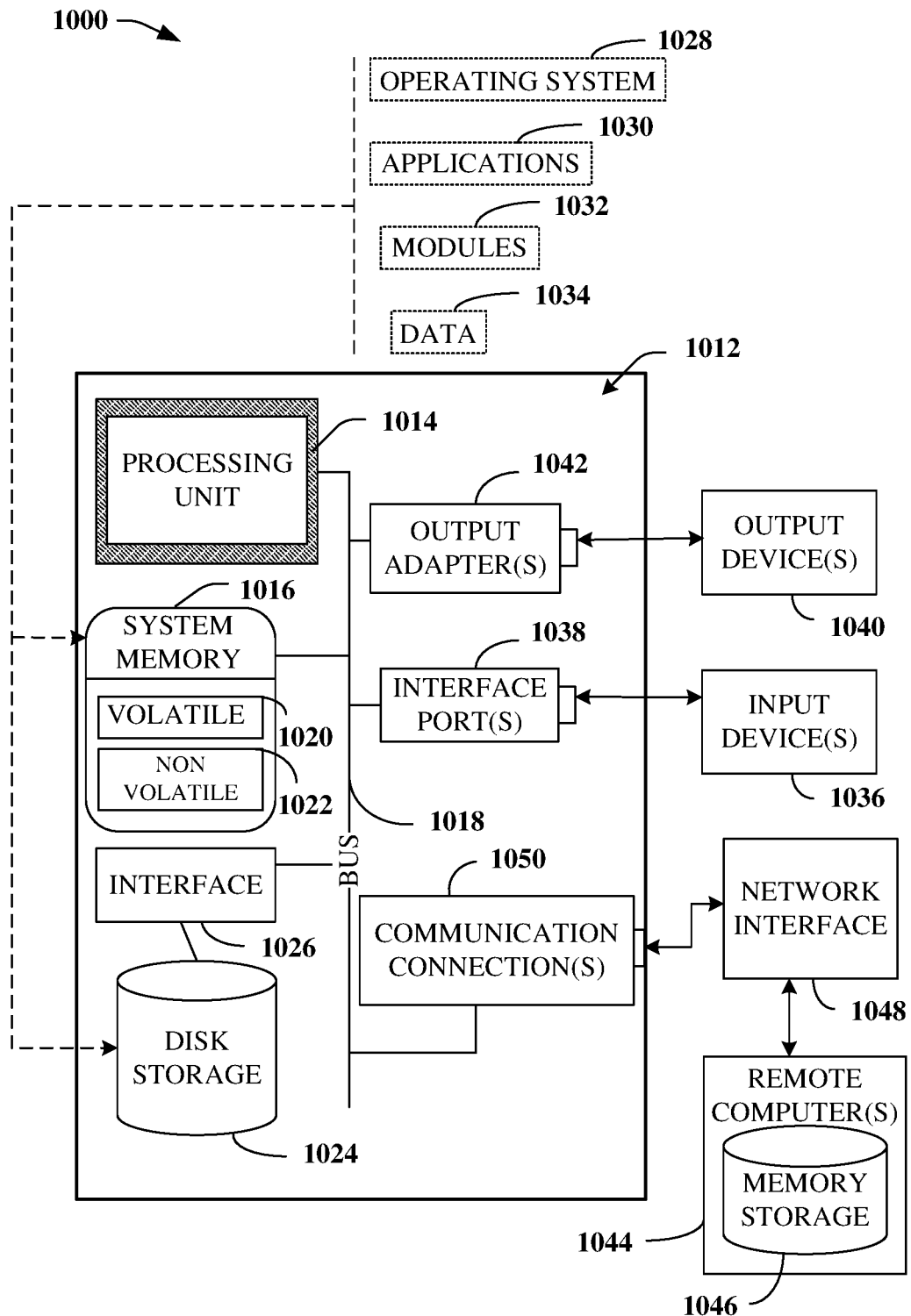
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct, such as 102-602, etc., in doubly mapped cluster, e.g., 260, 360-368, 460-466, 560-566, 660-666, etc., in a mapped cluster control component, e.g., 220-520, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a doubly mapped cluster schema, altering the doubly mapped cluster schema until one or more rules are determined to be satisfied, allocating storage space according to the doubly mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to receiving a real cluster storage system criterion, determining a first doubly mapped cluster schema;
allocating storage space of the real cluster storage system as a first doubly mapped cluster based on the first doubly mapped cluster schema;
altering, in response to a change in an amount of data to be stored according to the first doubly mapped cluster schema, the first doubly mapped cluster schema, resulting in an updated doubly mapped cluster schema and an updated first doubly mapped cluster having a different amount of storage space than the first doubly mapped cluster; and
facilitating a data operation corresponding to a data storage location comprised in the real cluster storage system according to the updated doubly mapped cluster based on the updated doubly mapped cluster schema.

2. The system of claim 1, wherein the real cluster storage system comprises a first number of real data storage clusters.

3. The system of claim 2, wherein a real data storage cluster of the first number of real data storage clusters comprises a second number of hardware data storage nodes, wherein a hardware data storage node of the second number of hardware storage nodes comprises a third number of data storage devices, wherein a storage device of the third number of hardware storage nodes comprises a fourth number of extents, wherein an extent of the fourth number of extents comprises the data storage location.

4. The system of claim 1, wherein the allocating the storage space of the real cluster is based on an overall amount of storage of the real cluster storage system.

5. The system of claim 1, wherein the allocating the storage space of the real cluster is based on an indication of an amount of data to be stored via the first doubly mapped cluster.

6. The system of claim 1, wherein the allocating the storage space of the real cluster is based on an indication of an amount of data stored via a second doubly mapped cluster allocated from the real cluster storage system.

7. The system of claim 1, wherein the operations further comprise, in response to determining that a rule related to a constraint on disk allocation has been satisfied, preventing the allocating the storage space based on the first doubly mapped cluster schema.

8. The system of claim 1, wherein the operations further comprise, in response to determining that a rule related to a constraint on extent allocation has been satisfied, preventing the allocating the storage space based on the first doubly mapped cluster schema.

9. The system of claim 1, wherein the facilitating the data operation is based on information indicating a logical data storage location, in accord with the first doubly mapped cluster schema, being received in conjunction with receiving the data operation, and wherein the logical data storage location corresponds to the data storage location.

10. The system of claim 1, wherein a first size of the first doubly mapped cluster is a same size as a second size of a real cluster storage system.

11. The system of claim 1, wherein a first size of the first doubly mapped cluster is a different size than a second size of a second doubly mapped cluster.

12. The system of claim 1, wherein the operations further comprise:
wherein the altering the first doubly mapped cluster schema comprises
reallocating the storage space of the real cluster storage system based on the updated first doubly mapped cluster schema, resulting in the updated first doubly mapped cluster.

13. The system of claim 1, wherein the altering the first doubly mapped cluster schema results in the updated first doubly mapped cluster having more storage space than the first doubly mapped cluster.

14. The system of claim 1, wherein the altering the first doubly mapped cluster schema results in the updated first doubly mapped cluster having less storage space than the first doubly mapped cluster.

15. A method, comprising:
in response to receiving real cluster storage system criteria, allocating, by a system comprising a processor and a memory, storage space of the real cluster storage system as a first doubly mapped cluster according to a determined first doubly mapped cluster schema based on the real cluster storage system criteria;
updating, by the system, the first doubly mapped cluster schema in response to determining a change in an amount of data to be stored according to the first doubly mapped cluster schema, resulting in an updated doubly mapped cluster schema;
reallocating, by the system, the storage space of the real cluster storage system based on the updated first doubly mapped cluster schema, resulting in an updated first doubly mapped cluster having a different amount of storage space than the first doubly mapped cluster; and
causing, by the system, a data operation to occur in the allocated storage space of the real cluster storage system according to the updated doubly mapped cluster and based on the updated doubly mapped cluster schema.

16. The method of claim 15, wherein the allocating the storage space is according to a determined first doubly mapped cluster schema based on:
the real cluster storage system criteria,
a request for an indicated amount of storage space, and
a second doubly mapped cluster schema corresponding to a second doubly mapped cluster allocated from the storage space of the real cluster storage system.

17. The method of claim 15, wherein the receiving the real cluster storage system criteria comprises receiving an indication of storage space corresponding to a first extent of a first storage device and a second extent of a second storage device, wherein the first storage device is located in a first geographic area, and wherein the second storage device is located in a second geographic area different than the first geographic area.

18. A non-transitory machine-readable medium, comprising executable instructions that, when executed by a processor, facilitate performance of operations, comprising:
determining a first doubly mapped cluster schema based on a first request for first storage space in a real cluster storage system;
altering the first doubly mapped cluster schema until the first doubly mapped cluster schema is determined to satisfy a rule related to a doubly mapped cluster constraint;
allocating the first storage space of the real cluster storage system as a first doubly mapped cluster, according to the first doubly mapped cluster schema, based on a criterion of the real cluster storage system;
updating, in response to a change in an amount of data to be stored according to the first doubly mapped cluster schema, the first doubly mapped cluster schema, resulting in an updated doubly mapped cluster schema;
reallocating the storage space of the real cluster storage system based on the updated first doubly mapped cluster schema, resulting in an updated first doubly mapped cluster having a different amount of storage space than the first doubly mapped cluster; and
providing information enabling a data operation corresponding to the updated doubly mapped cluster to occur based on the updated doubly mapped cluster schema.

19. The non-transitory machine-readable medium of claim 18, wherein the doubly mapped cluster constraint indicates that disks of a first real node of the real cluster storage system are prohibited from use in more than one mapped node of a doubly mapped cluster.

20. The non-transitory machine-readable medium of claim 18, wherein the doubly mapped cluster constraint indicates that extents of a disk of a first real node of the real cluster storage system are prohibited from use in more than one mapped node of a doubly mapped cluster.

* * * * *